(12) United States Patent
Grandhi et al.

(10) Patent No.: US 11,375,448 B2
(45) Date of Patent: Jun. 28, 2022

(54) METHOD AND SYSTEM FOR BEACON INFORMATION PROVISIONING, TRANSMISSIONS AND PROTOCOL ENHANCEMENTS

(71) Applicant: InterDigital Patent Holdings, Inc., Wilmington, DE (US)

(72) Inventors: Sudheer A. Grandhi, Pleasanton, CA (US); Lei Wang, San Diego, CA (US); Guodong Zhang, Woodbury, NY (US); Xiaofei Wang, Cedar Grove, NJ (US); Monisha Ghosh, Chicago, IL (US); Hanqing Lou, Syosset, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/358,269

(22) Filed: Mar. 19, 2019

(65) Prior Publication Data

US 2019/0215764 A1 Jul. 11, 2019

Related U.S. Application Data

(63) Continuation of application No. 13/782,709, filed on Mar. 1, 2013, now Pat. No. 10,237,818.
(Continued)

(51) Int. Cl.
*H04W 48/20* (2009.01)
*H04W 48/16* (2009.01)
(Continued)

(52) U.S. Cl.
CPC .......... *H04W 48/20* (2013.01); *H04W 48/16* (2013.01); *H04B 7/0456* (2013.01); *H04B 7/0617* (2013.01); *H04W 48/12* (2013.01)

(58) Field of Classification Search
None
See application file for complete search history.

(56) References Cited

U.S. PATENT DOCUMENTS

| 7,881,322 B1 | 2/2011 | Benveniste |
| 2004/0002356 A1 | 4/2004 | Walton et al. |

(Continued)

FOREIGN PATENT DOCUMENTS

| CN | 101461204 | 6/2009 |
| CN | 101742561 | 6/2010 |

(Continued)

OTHER PUBLICATIONS

Kneckt et al., "Active Scanning Enabling FILS", IEEE P802.11 Wireless LANs, IEEE 802.11-11/1619r3, Jan. 19, 2012 (Year: 2012).*

(Continued)

*Primary Examiner* — Jenkey Van
(74) *Attorney, Agent, or Firm* — Volpe Koenig

(57) ABSTRACT

A method for beacon information provisioning, transmissions and protocol enhancements includes defining multiple level beacons based on the attributes of beacon information fields/elements. A short beacon may be used in addition to a primary beacon in space-time block code (STBC) modes, non-STBC modes and in multiple bandwidth modes. The short beacons may also be used for Fast Initial Link Setup (FILS) and to extend system coverage range. Beacon transmissions may use adaptive modulation and coding set/scheme (MCS).

12 Claims, 14 Drawing Sheets

| 1001 | 1002 | 1003 | 1004 | 1005 | 1006 | 1007 | 1008 | 1009 | 1010 |
|---|---|---|---|---|---|---|---|---|---|
| INTERWORKING | ADVERTISEMENT PROTOCOL | ROAMING CONSORTIUM | IP ADDR AVAIL. | DOMAIN | NAI LIST | 3GPP | AP LIST | TIME-STAMP | IP ADDR TYPE AVAIL. |

Related U.S. Application Data

(60) Provisional application No. 61/720,750, filed on Oct. 31, 2012, provisional application No. 61/667,648, filed on Jul. 3, 2012, provisional application No. 61/606,180, filed on Mar. 2, 2012.

(51) Int. Cl.
  H04B 7/0456 (2017.01)
  H04B 7/06 (2006.01)
  H04W 48/12 (2009.01)

(56) References Cited

U.S. PATENT DOCUMENTS

| | | |
|---|---|---|
| 2006/0050742 A1 | 3/2006 | Grandhi et al. |
| 2006/0223527 A1 | 10/2006 | Lee et al. |
| 2007/0211745 A1 | 9/2007 | Deshpande |
| 2008/0013479 A1 | 1/2008 | Li et al. |
| 2008/0225768 A1 | 9/2008 | Wentink et al. |
| 2008/0232270 A1 | 9/2008 | Fleming et al. |
| 2009/0046682 A1 | 2/2009 | Kim et al. |
| 2009/0154416 A1 | 6/2009 | Lu et al. |
| 2010/0002627 A1 | 1/2010 | Ngo et al. |
| 2011/0019653 A1 | 1/2011 | Seok |
| 2011/0069684 A1 | 3/2011 | Jeon et al. |
| 2011/0149850 A1* | 6/2011 | Sashihara ............ H04W 48/16 370/328 |
| 2012/0314696 A1 | 12/2012 | Liu |
| 2013/0051293 A1 | 2/2013 | Wentink et al. |
| 2013/0107703 A1* | 5/2013 | Cherian ............... H04W 48/12 370/230 |
| 2013/0142124 A1 | 6/2013 | Abraham |
| 2013/0177002 A1 | 7/2013 | Sun et al. |
| 2013/0235773 A1 | 9/2013 | Wang et al. |
| 2015/0098358 A1* | 4/2015 | Park ..................... H04W 48/16 370/254 |
| 2015/0139209 A1* | 5/2015 | Park ..................... H04W 76/00 370/338 |
| 2016/0113016 A1 | 4/2016 | Kim et al. |
| 2019/0289539 A1* | 9/2019 | Lee ..................... H04W 40/246 |

FOREIGN PATENT DOCUMENTS

| | | |
|---|---|---|
| JP | 2009-500945 | 1/2009 |
| JP | 2011-182436 | 9/2011 |
| JP | 2013-520938 | 6/2013 |
| TW | 2008-26577 | 6/2008 |
| TW | 2012-03975 | 1/2012 |
| WO | 2006/120555 | 11/2006 |
| WO | 2007/005319 | 1/2007 |
| WO | 2007/047757 | 4/2007 |
| WO | 2008/152597 | 12/2008 |
| WO | 2009/113798 | 9/2009 |
| WO | 2011/106538 | 9/2011 |

OTHER PUBLICATIONS

"Part 11: Wireless LAN Medium Access Control (MAC) and Physical Layer (PHY) Specifications", IEEE Draft P802.11-REVmb/012, Nov. 2011, pp. 111-119 and 1037-1042. http://ieeexplore.ieee.org/stamp/stamp.jsp?tp=&arnumber=6074906.
Abraham et al., "Short Beacon," IEEE 802.11-11/1503r1 (Nov. 2011).
Abraham et al., "Short Beacon," IEEE 802.11-12/0129r1 (Jan. 2012).
De Vegt, "Spec Framework Text for .11ah Bandwidth Modes," IEEE 802.11-11/1294r0 (Sep. 2011).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6GHz, IEEE P802.11ac/D2.0 (Jan. 2012).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 9: Interworking with External Networks, IEEE Std. 802.11u-2011 (Feb. 25, 2011).
Emmelmann, "IEEE P802.11 Wireless LANs, TGai Requirements Document," IEEE 802.11-11/0745r5 (May 2011).
Faccin et al., "A Partial TGu Proposal on Optimization of Delivery of Network Discovery Information through Layered Beacons," IEEE 802.11-06/0286r0 (Mar. 2006).
IEEE Compter Society, "IEEE Standard for Information Technology—Telecommunications and information exchange between systems—Local and metropolitan area networks—Specific requirements; Part 11: Wireless LAN Medium Access Control (MAC) and Physical Layer (PHY) Specifications," IEEE 802.11-2007 (Mar. 8, 2007).
IEEE P802.11ac/01.0, "Draft Standard for Information Technology—Telecommunications and information exchange between systems—Local and metropolitan area networks—Specific requirements. Part 11: Wireless LAN Medium Access Control (MAC) and Physical Layer (PHY) specifications. Amendment 5: Enhancements for Very High Throughput for Operation in Bands below 6 GHz", May 2011, 263 pages.
IEEE Standard for Information Technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information Technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information Technology—Telecommunications and information exchange between systems—Local and metropolitan area networks—Specific requirements; Part 11: Wireless LAN Medium Access Control (MAC) and Physical Layer (PHY) specifications, IEEE Draft P802.11-REVmb/D12 (Nov. 2011).
Jagadeesha. RB: "Soft Handover scheme for WSN nodes using media independent handover functions," Network and Complex Systems, vol. 1, No. 2, 2011, 13 pages.
Kneckt et al., "Active Scanning Enabling FILS," IEEE P802.11 Wireless LANs, IEEE 802.11-11/1619r1 (Jan. 16, 2012).
Li et al., "AP discovery with FILS beacon," IEEE 802.11-12/0042r0 (Jan. 8, 2012).
Liu et al., "Mid-CRC in Long Beacon," IEEE 802.11-12/1100r1 (Sep. 17, 2012).
Stefano, "A Partial TGu Proposal on Optimization of Delivery of Network Discovery Information through Layered Beacons", IEEE 802.11-06/0286r0, Jun. 3, 2006.
Stephenson et al. "MLME-Scanning Procedures", Jan. 2008, https://mentor.ieee.org/802.11/dcn/08/11-08-0046-00-000u-lb107-mlme-scanning.doc.
Wang et al., "Proposed SFD Text for 802.11ai Passive Scanning Improvement," IEEE 11-12-0406-05-00ai (May 2012).
Wang, "Ad Hoc Discussions of 802.11ai Passive Scanning during Jul. 2012 San Diego Meeting," IEEE 11-12-0913-03-00ai (Jul. 2012).
Wang, "Discussions about 802.11ai FILS Discovery Frame (DF) Content Design," IEEE 11-12-0741-01-00ai (Jul. 2012).
Wang, "Frame Format Design Considerations for 802.11ai FILS Discovery Frame," IEEE 11-12-0742-00-00ai (Jul. 2012).
Wang, "Passive Scanning Improvement Ad Hoc Report," IEEE 11-12-0669-01-00ai (May 2012).
Wang, "Proposed 802.11ai Specification Text for FD Frame Processing," IEEE 802.11-12/1168 (Sep. 2012).

* cited by examiner

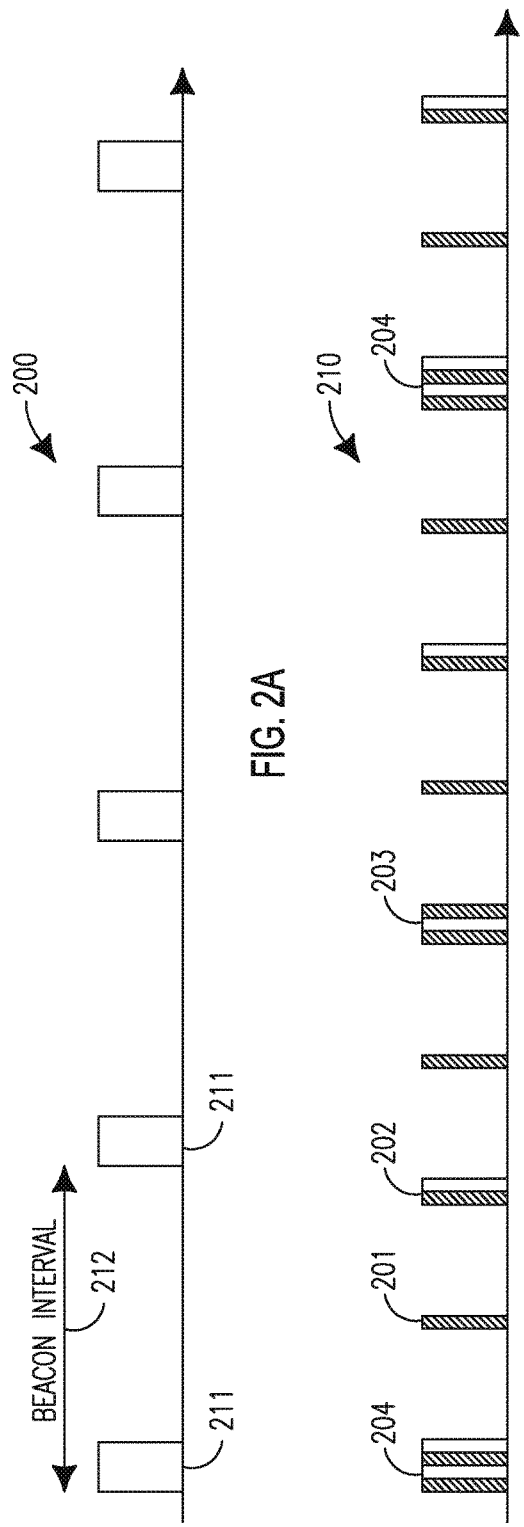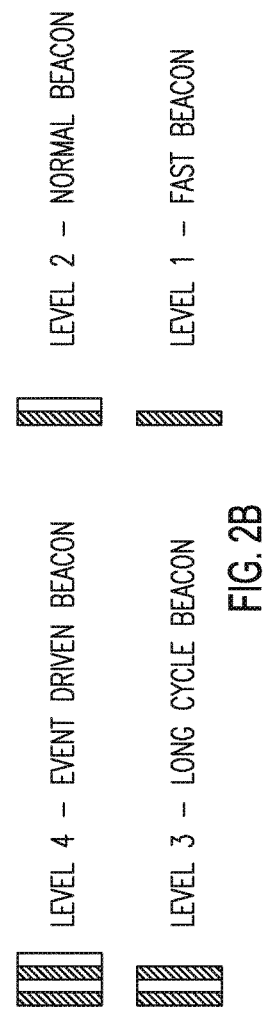

| 1001 | 1002 | 1003 | 1004 | 1005 | 1006 | 1007 | 1008 | 1009 | 1010 |
|---|---|---|---|---|---|---|---|---|---|
| INTERWORKING | ADVERTISEMENT PROTOCOL | ROAMING CONSORTIUM | IP ADDR AVAIL. | DOMAIN | NAI LIST | 3GPP | AP LIST | TIME-STAMP | IP ADDR TYPE AVAIL. |

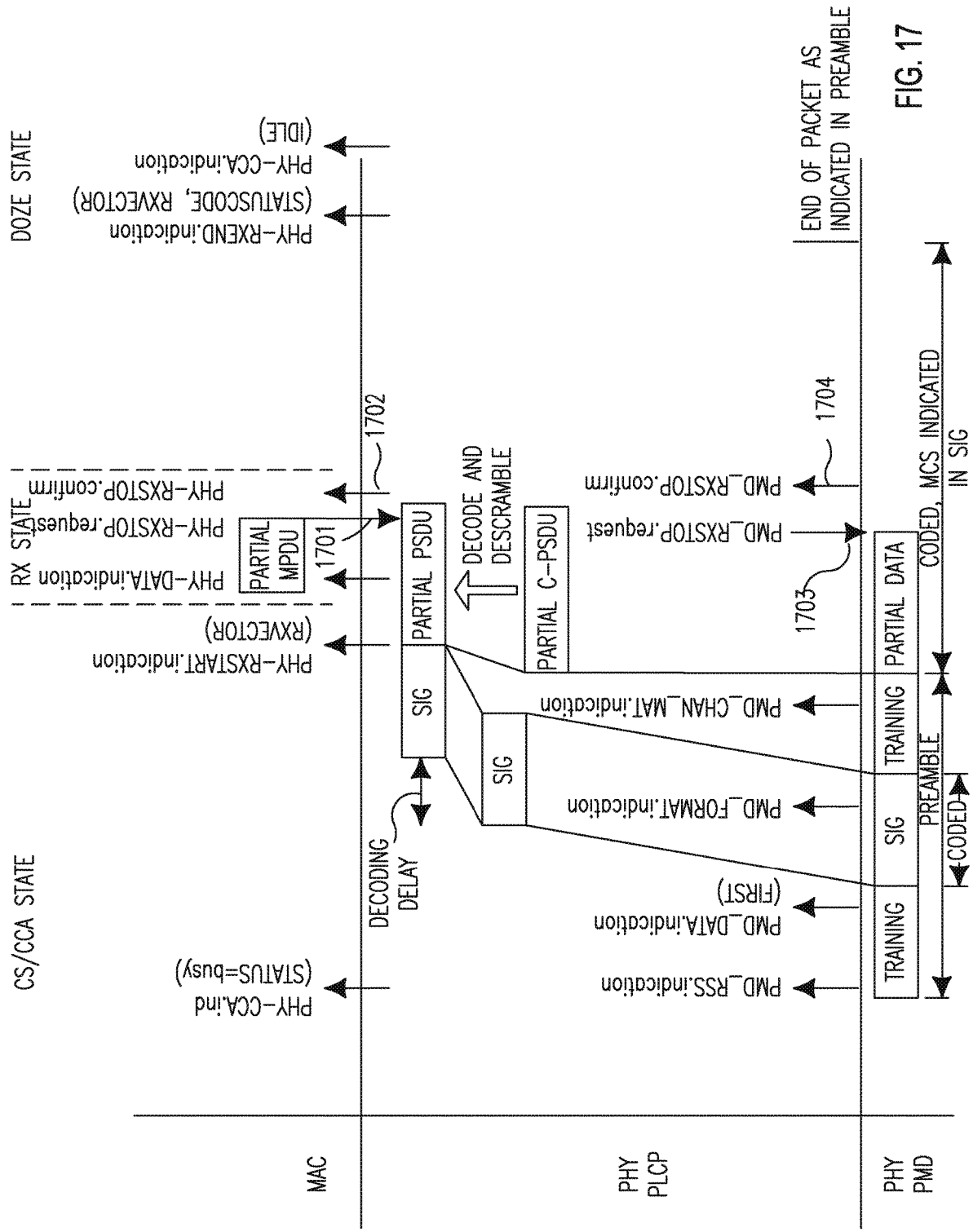

METHOD AND SYSTEM FOR BEACON INFORMATION PROVISIONING, TRANSMISSIONS AND PROTOCOL ENHANCEMENTS

CROSS REFERENCE TO RELATED APPLICATIONS

This application is a continuation of U.S. patent application Ser. No. 13/782,709 filed Mar. 1, 2013, and claims the benefit of U.S. provisional application No. 61/606,180, filed on Mar. 2, 2012; U.S. provisional application No. 61/667,648, filed on Jul. 3, 2012; and U.S. provisional application No. 61/720,750, filed on Oct. 31, 2012, the contents of which are hereby incorporated by reference herein.

BACKGROUND

A wireless local area network (WLAN) in infrastructure basic service set (BSS) mode has an access point (AP) for the BSS and one or more stations (STAs) associated with the AP. The AP typically has access or interface to a distribution system (DS) or another type of wired/wireless network that carries traffic in and out of the BSS. Traffic to STAs that originates from outside the BSS arrives through the AP and is delivered to the STAs. Traffic originating from STAs to destinations outside the BSS is sent to the AP to be delivered to the respective destinations. Traffic between STAs within the BSS ("peer-to-peer" traffic) may also be sent through the AP where the source STA sends traffic to the AP and the AP delivers the traffic to the destination STA. A WLAN in Independent BSS mode has no AP, and STAs communicate directly with each other.

WLAN systems which utilize beacon transmission procedures for discovery of the AP by the STA, use a periodic transmission of the beacon in the Basic Service Set (BSS) from the AP. The beacon supports various functions in the system by providing an AP Advertisement with the BSSID, Synchronization of the STAs in the BSS, capability information, BSS operation information, system parameters for medium access, transmit power limits, as well as many optional information elements. The frame format for typical beacons for WLAN BSSs may be >100 bytes long and in typical enterprise environment beacons are ~230 bytes. The overhead of such a beacon may include a substantial amount of information. For example, a beacon of 100 bytes at the lowest transmission rate (100 Kbps) may require greater than 8 ms transmission time (i.e., at the lowest rate in order for all STAs to be able to decode it). For a beacon interval of 100 ms, there may be greater than 8% overhead. To support a 100 ms fast link setup time, beacon intervals must be significantly shorter than 100 ms, which would result in an overhead value significantly greater than the 8% overhead estimate.

SUMMARY

Methods and systems for beacon information provisioning, transmissions and protocol enhancements are described herein. In one method, a single large beacon is split into multiple level beacons for beacon information provisioning and transmission based on the attributes of each beacon information fields/elements. These attributes may include purpose, usage, periodicity, stability, broadcast/multicast/unicast and the like. Signaling mechanisms and operation procedures may be defined based on the multiple level beaconing scheme, for both backward compatible wireless local area network (WLAN) systems and Greenfield WLAN systems. A short beacon may be used in addition to a primary beacon in space-time block code (STBC) modes, non-STBC modes and in multiple bandwidth modes. The short beacons may also be used for Fast Initial Link Setup (FILS) and to extend system coverage range. A short beacon with a low rate transmission and/or with a directional transmission may be used. Modifications to the primary beacon may be made for small bandwidth transmission to support short beacons and multiple bandwidth modes. Beacon transmissions may use adaptive modulation and coding set/scheme (MCS) sets. Methods to support stopping of processing of packets are also described.

BRIEF DESCRIPTION OF THE DRAWINGS

A more detailed understanding may be had from the following description, given by way of example in conjunction with the accompanying drawings wherein:

FIGS. 2A and 2B show examples of a single beacon and a multiple level beacon scheme, respectively;

FIG. 3 shows an example of multiple level beacon classifications;

FIG. 10 shows an example FILS short beacon configuration;

FIG. 12 shows an example of a modified primary beacon that includes short beacon information;

FIG. 13 shows an example modification to a IEEE 802.11ah short beacon frame to carry STBC or non-STBC mode related information;

FIG. 17 shows an example of a modified generic PLCP receive procedure with primitives to support the stopping of processing of packets.

DETAILED DESCRIPTION

Figure 1A:
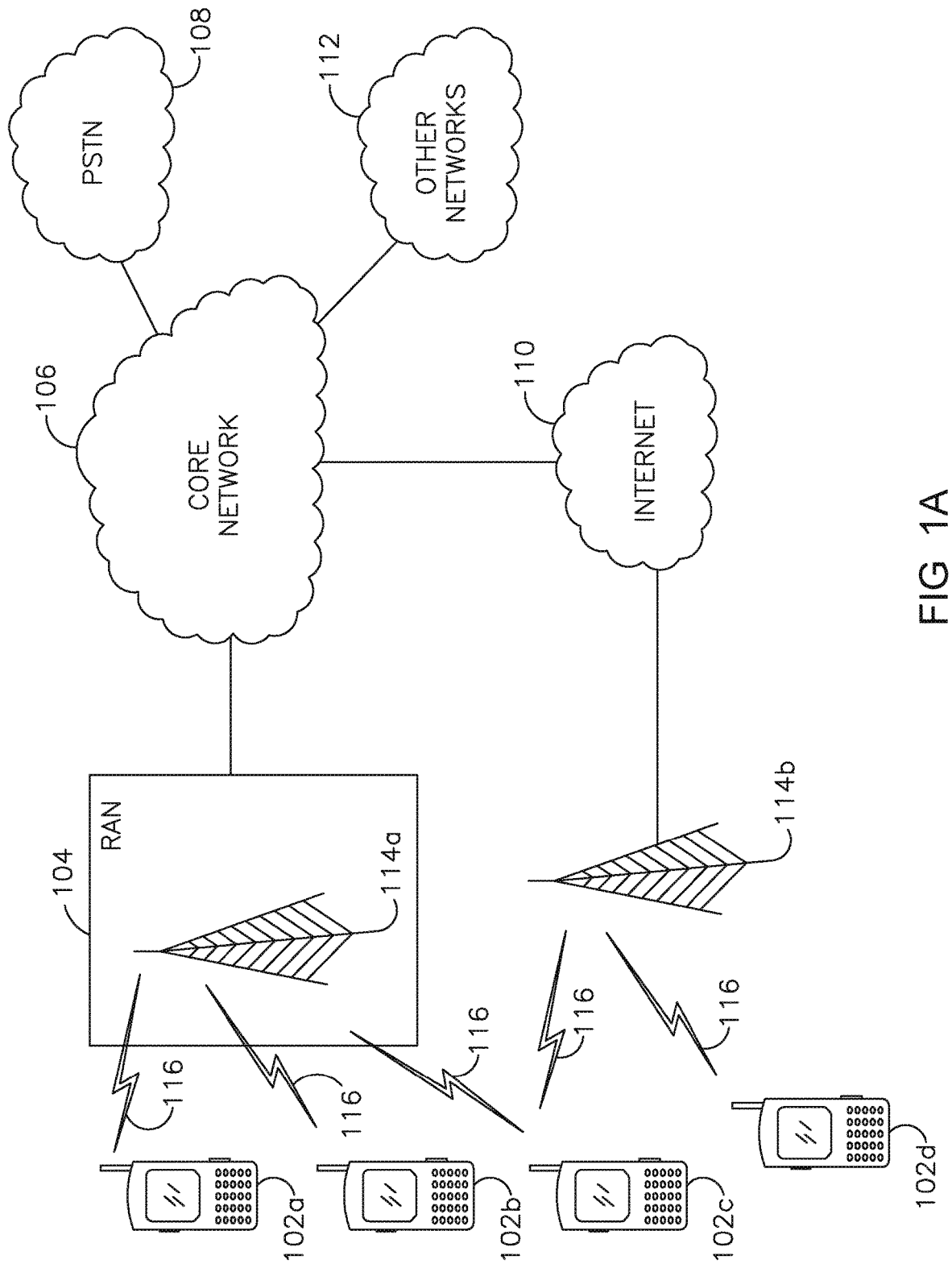
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
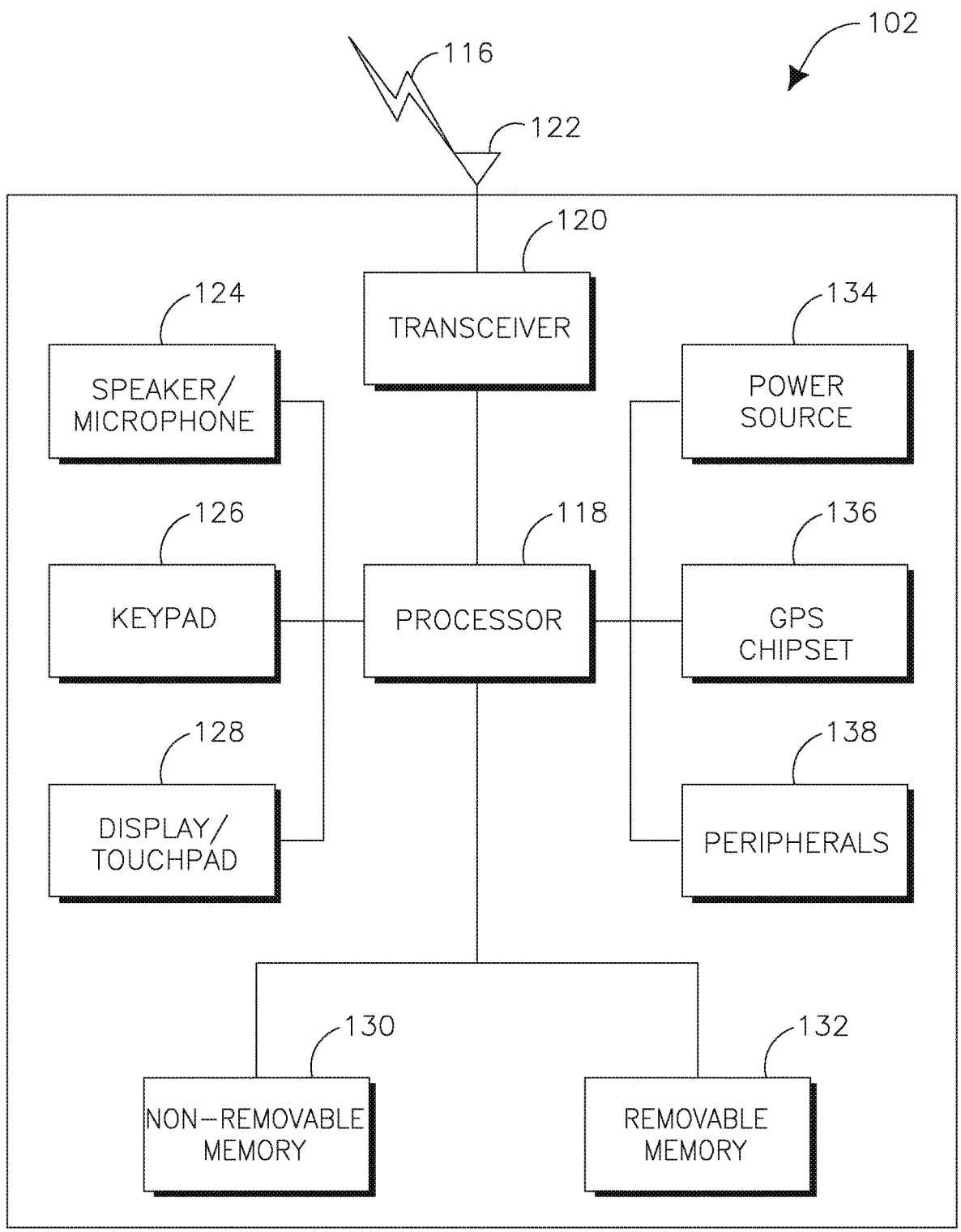
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chip set 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
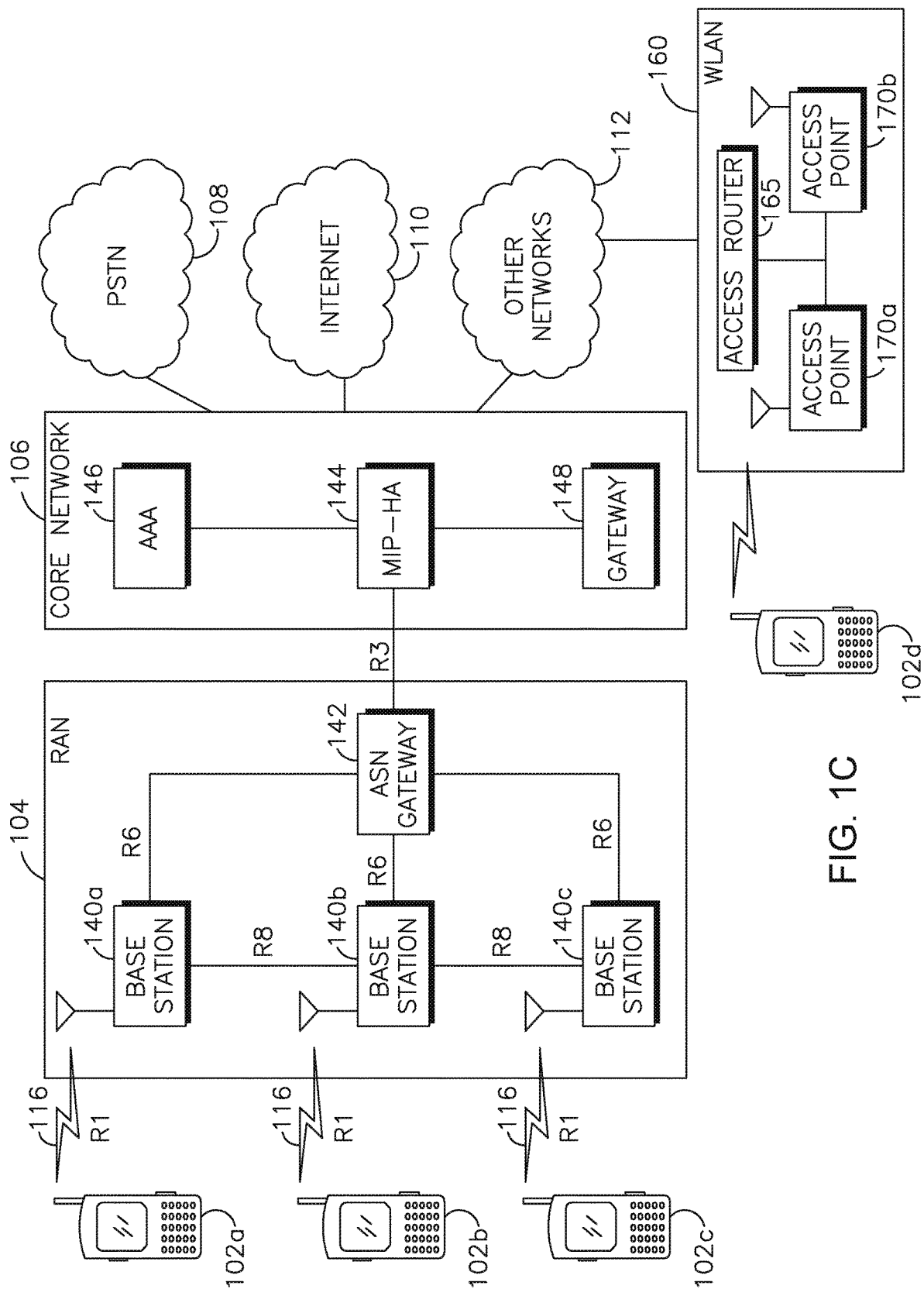
FIG. 1C is a system diagram of an example radio access network and an example core network that may be used within the communications system illustrated in FIG. 1A.

FIG. 1C is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1C, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 142 may be defined as an R6 reference point. The R6 reference point may include protocols for facilitating mobility management based on mobility events associated with each of the WTRUs 102a, 102b, 102c.

As shown in FIG. 1C, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1C, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

In a first embodiment, a multiple level beaconing (MLB) scheme is defined, which organizes beacon information into multiple level beacons for beacon information provisioning and transmission. The multiple level beacons are defined based on the attributes of each beacon information fields/elements, e.g., purpose, usage, periodicity, stability, broadcast/multicast/unicast, and the like.

FIGS. 2A and 2B show examples of beacon transmissions. In FIG. 2A, a single beacon scheme 200 is illustrated, in which each beacon 211 is transmission at a regular beacon interval 212. FIG. 2B shows an example of a multiple-level beaconing scheme 210, where four beacon levels are defined by the beacon's transmission frequency. As shown in FIG. 2B, each beacon level may be transmitted at different periodicities. Level 1 represents a fast beacon (e.g., transmitted every 50 ms). Level 2 represents a normal beacon transmitted every 100 ms. A long-cycle beacon is transmitted every second for Level 3, and Level 4 represents an event driven, non-periodic beacon. The multiple level beacon time intervals may be specified as system configuration parameters and managed in IEEE 802dot11-MIB, and/or in a lower level beacon (i.e., having shorter intervals), which contains a pointer field pointing to the time of next transmission of its next-level beacon.

The contents of the multiple level beacons may be completely different (i.e., no overlapping), partially overlapping (i.e., two different levels of beacons may have some common information fields or elements), or forward-inclusive (i.e., where the contents of a lower level beacon are completely included in a next higher level beacon) FIG. 2B shows an example of forward-inclusive beacons. For example, the Level 4 event driven beacon 204 includes all information of the Level 1, Level 2 and Level 3 beacons. Also note that the Level 1 fast beacon information is sent as a single beacon 201, as well as within the Level 2 normal beacon 202, Level 3 beacon 203 and Level 4 beacon 204. Similarly, the Level 2 beacon information is included in Level 4 and Level 3 beacons 203, 204, in addition to the Level 2 beacon instance 202. The Level 3 beacon information is sent both at 203 and at the Level 4 beacon 204.

The organization of beacon information fields and elements in multiple level beacons may be based on one or more of the following considerations. The usage or purpose of the beacon information fields/elements (e.g., for link setup, for transmitting STA identifications, for PHY parameter descriptions, for traffic indications, for MAC/Network capability indications, and the like) may be considered. The states of intended reception STAs (e.g., unauthenticated/unassociated, authenticated/unassociated, authenticated/associated) determined, where different Modulation Coding Scheme (MCS) schemes may be used to transmit the different level of multiple level beacon frames. The nature of broadcast, multicast, and unicast of the beacon information fields/elements may also be considered.

For a beacon information element (IE) (i.e., formatted in Element ID, Length, and information body, in addition to using system configuration parameters to indicate its presence in beacon frames), a new system configuration parameter may also be defined to specify the periodicity, beacon level, and/or delay tolerance of its provisioning. A version number information field, or element, of a beacon may also be included in the beacon frame for which the information is intended, or for information pertaining to lower level beacon frames, or the version numbers for all beacons may be included in every beacon, where the version number represents the change count which increments every time the contents of the beacon, or beacons, have changed.

The signaling mechanisms, operation, and procedures corresponding to the proposed multiple level beaconing scheme may also defined, for both backward compatible WLAN systems and Greenfield WLAN systems.

When applying multiple level beaconing in a Greenfield WLAN system, it means all the stations support the multiple level beaconing. In this case, the legacy beacon scheme does not need to be supported, where the legacy beacon scheme refers to that as specified in the current IEEE 802.11 standards.

The multiple level beaconing improves the beacon information provisioning and transmission efficiency. Instead of minimizing the use of the periodic broadcast transmissions, the AP according to this embodiment broadcasts and/or sends periodic transmissions only when necessary. Also, when using periodic transmission, the required periodicity is matched. The following describes an example of the multiple level beaconing, where beacon information fields and elements are grouped and provisioned based on their usages and purposes.

FIG. 3 shows an example multiple level beacon classification in which four levels of beacons are defined according to usages and purposes. For the example as shown in FIG. 3, based on the following usage classification of the beacon information fields and elements, there are four levels of beacons, one level per class. For simplicity of description, the four levels of beacons are termed Link Setup Beacon (LS-B) 301, Operation Initialization Beacon (OI-B) 302, Link and Operation Maintenance Beacon (LOM-B) 303, and Traffic Indication Beacon (TI-B) 304, respectively.

For the Link Setup Beacon 301, the transmitted beacon information relates to (PHY) Link setup for both Rx and Tx for a STA, e.g., Time Stamp, SSID, PHY-specific parameter sets, country, and the like. With respect to the Operation Initialization beacon 302, PHY/MAC network capability descriptors are sent along with other information needed for Operation initialization (e.g., capability information field and multiple information IEs (e.g., Supported Rates, Extended Supported Rates, Extended Capabilities, QoS Traffic Capability, HT capability, Interworking, RSN, CF Parameter Set, HT Operation, EDCA Parameter Set, DSE Registered Location, and the like)). The Link and operation maintenance classification beacon 303 includes information such as a TPC Report, Measurement Pilot Transmission Information, Antenna Information, BSS Average Access Delay, BSS Load, BSS Available Admission Capacity, AP Channel Report, Channel Switch Announcement, Quiet, Extended Channel Switch Announcement, and the like. The Traffic indication beacon 304 includes, for example, TIM, Emergency Alert Identifier, and the like.

The Link Setup Beacon 301 may be broadcasted periodically, where the periodicity is defined by a system configuration parameter that is managed through IEEE 802dot11-MIB. In a WLAN system that requires fast link setup, the periodicity of the Link Setup Beacon 301 may be set to a shorter interval, e.g., 25 ms or 50 ms, than the current commonly used beacon interval (i.e., 100 ms). On the other hand, if the link setup may tolerate some delays, the periodicity of the Link Setup Beacon 301 may be set to the same as the current commonly used IEEE 802.11 beacon, i.e., 100 ms, or even longer.

The Operation Initialization Beacon 302 may be transmitted in a unicast or broadcast/multicast manner only when the transmitting STA receives indication that another station or stations are attempting to establish connectivity. In other words, the transmissions of the Operation Initialization Beacon 302 is not periodical, instead, it is event-driven. The connection attempt indication may be a received requisition frame for another station, e.g., probe request, association request, or a newly introduced connection request from, or a notification from network element, e.g., a server in the network.

The Link and Operation Maintenance Beacon 303 may be transmitted in a unicast or broadcast/multicast manner either periodically or event-driven. When periodically, the periodicity may be of longer interval than the Link Setup Beacon 301. The transmissions of Link and Operation Maintenance Beacon 302 may be triggered by the channel condition related events, e.g., channel switching, BSS load and/or access delay exceed certain thresholds, etc.

The Traffic Indication Beacon 304 may be transmitted in a unicast or broadcast/multicast manner either periodically or event-driven. If the transmitting station of the traffic indication beacon knows the listening windows of the receiving station or stations, it may be transmitted only in such listening windows in unicast manner for a single station or in multicast manner for a group of stations with the same listening windows. Otherwise, the Traffic Indication Beacon may be transmitted periodically in a unicast or multicast or broadcast manner, depending on the intended receiving station(s) of the traffic indication information, where the periodicity is chosen based on a trade-off between the latency and the overhead of traffic indication delivery. In addition, for unicast or multicast beacon transmissions, a higher date rate may be used as compared to the data rate used by broadcast transmissions, as long as all the intended receiving stations may support it.

For each beacon level, a version number or change indicator may be used in the beacon MAC header or frame body of this level beacon. The change indicator is a change count which increments every time the contents of the beacon, (of this level or next higher level), changes. The system may configure a fixed number of beacon contents, each represented by a version number. The beacon contents of each version may be specified in the standards or signaled to the STA when being configured. Alternatively, the STA may acquire the version and beacon contents mapping from receiving each particular version for at least one time. The beacon version number or change indicator may be signaled using the following example methods.

In one example method, the beacon version number or change indicator may be signaled in the MAC header in the beacon frame reusing the one or several information fields which are not used when a beacon is transmitted, (e.g. when Type="00" and Subtype="1000"). Examples include Retry field, More Data field, Order field, Sequence Control field.

In another example, the beacon version number or change indicator may be signaled in the MAC header in the beacon frame using reserved Subtypes for Management frame type (for example, Type="00" and Subtype="0110", "0111" and "1111" to indicator new beacon level/type).

Alternatively, the beacon version number or change indicator may be signaled in the Physical layer convergence procedure (PLCP) preamble. Different short training field (STF) or long training field (LTF) sequence and/or subcarrier mapping may be used to implicitly indicate different beacon version numbers or the contents of the beacon changes.

In yet another example, the beacon version number or change indicator may be signaled in the signal (SIG) field in the PLCP header.

For a multiple level beacon system with N levels, a beacon level/type indicator may be used for the receiving STA to distinguish different levels of beacon and their formats. Only $\lceil \log_2 N \rceil$ bits are needed to signal the beacon level/type. The methods described above may be used to signal the beacon level/type indicator. If a long information field, (such as the Sequence Control field), in the MAC header is reused for beacon level/type indicator, then only a fraction of such a information field may be actually reused.

Figure 4:
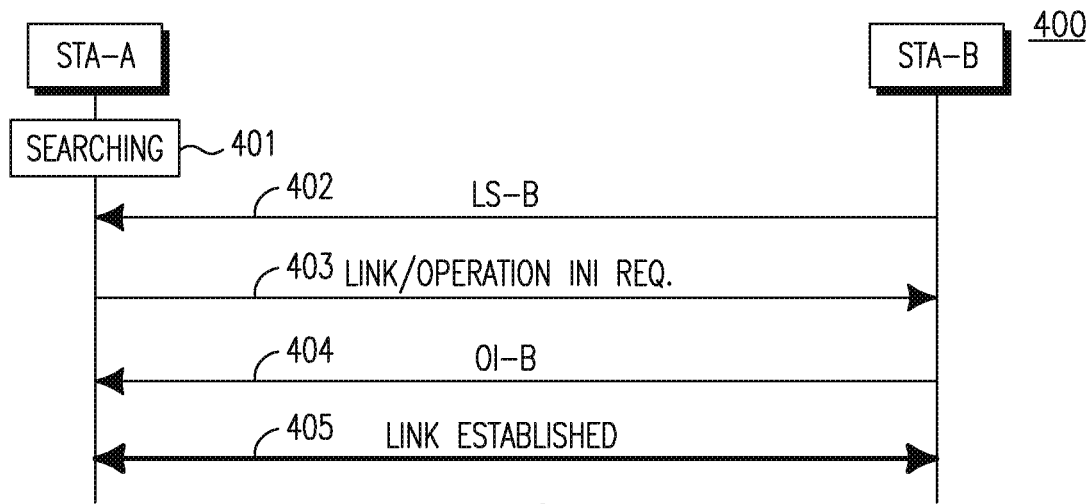
FIG. 4 shows an example signalling diagram for a STA and AP during link setup using multiple level beacons.

With the above multiple level beacon transmissions, a STA may follow a procedure as shown in FIG. 4 and described below for its link setup and operation initialization with an AP station in infrastructure BSS mode or another STA in other modes. A first STA, STA-A, starts to searching 401 for a WLAN system to connect to, e.g., listening to WLAN signals on WLAN channels. STA-A receives and decodes 402 a Link Setup Beacon 301, from which it obtains the essential information to access the WLAN channel with a STA-B which transmitted the Link Setup Beacon 301. STA-A transmits 403 a link/operation initialization request to STA-B, which responds 404 to STA-A with an Operation Initialization Beacon 302 containing the required information to establish an operational connection (e.g., security information, the MAC/network capability information, MAC operation parameters, additional PHY capability (in addition to the basic PHY link used in Link Setup Beacon 301 transmission and link/operation initialization request). STA-A may respond 404 to STA-B with its capability information, MAC operation parameters, security information, to continue the link/operation initialization, until an operational WLAN connection is established 405 between STA-A and STA-B, or the attempt of link/operation initialization has failed, due to some reasons, e.g., security, service provisioning, etc.

Note that, in the above procedure 400 for link setup and operation initialization, the Link Setup Beacon 301 needs to be broadcast periodically for a new station to detect an operational WLAN; and the Operation Initialization Beacon 302 is unicast only once upon being triggered by the request 403.

Figure 5:
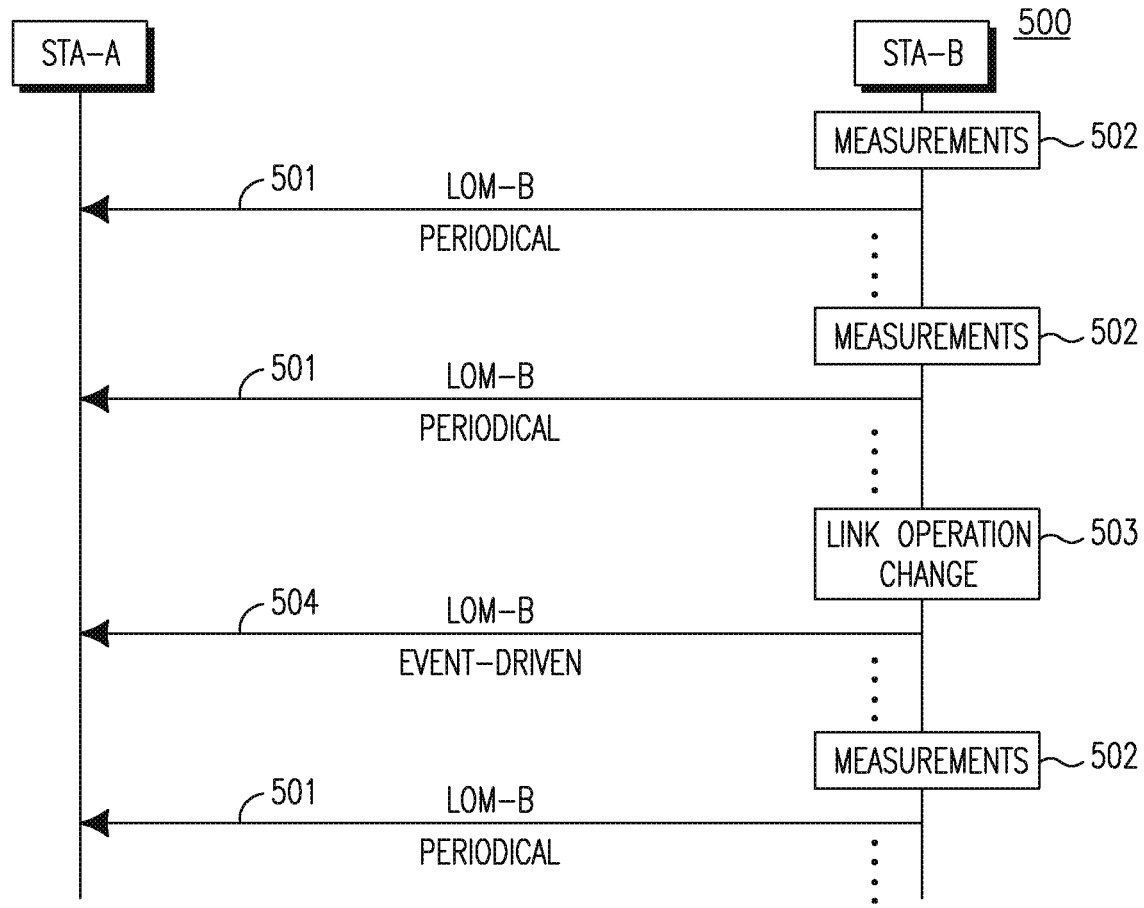
FIG. 5 shows an example of a signalling diagram to maintain a WLAN link in accordance with a multiple level beacon scheme.

FIG. 5 shows an example signaling diagram for a procedure 501 that may be used to maintain an WLAN link and its operation having been established using the multiple level beacon scheme. STA-B performs link quality measurements 502 and/or MAC/system performance measurements that may be periodically provisioned 501 through unicast or multicast/broadcast LOM-B 303, at the pre-negotiated or configured periodicity. The link operation changes 503 or link operation alert conditions may also trigger 504 the transmissions of LOM-Beacons 303 that include, for example, information such as channel switching, BSS load exceeding a predefined threshold, and the like.

For each received beacon of a particular level, the STA-A may obtain the level/type of the received beacon from the signaling in the MAC header, PLCP preamble or signal (SIG) field. STA-A may also obtain the version number of the received beacon from the signaling in the MAC header, PLCP preamble or SIG field. If the beacon contents of the received version are already known to the STA-A, it may skip reception and decoding of the rest of the beacon to save power. The STA-A may also obtain the change indicator of the received beacon from the signaling in the MAC header, PLCP preamble or SIG field. If the change indicator signals that the content of this beacon-level or the next higher level does not change since its last transmission, it may skip reception and decoding of the rest of the corresponding unchanged beacon to save power. Note that the above link and operation maintenance procedure 500 is a combination of periodic reporting of link quality/system performance measurements 502 and event-driven reporting of link condition changes/alerts 503.

Figure 6:
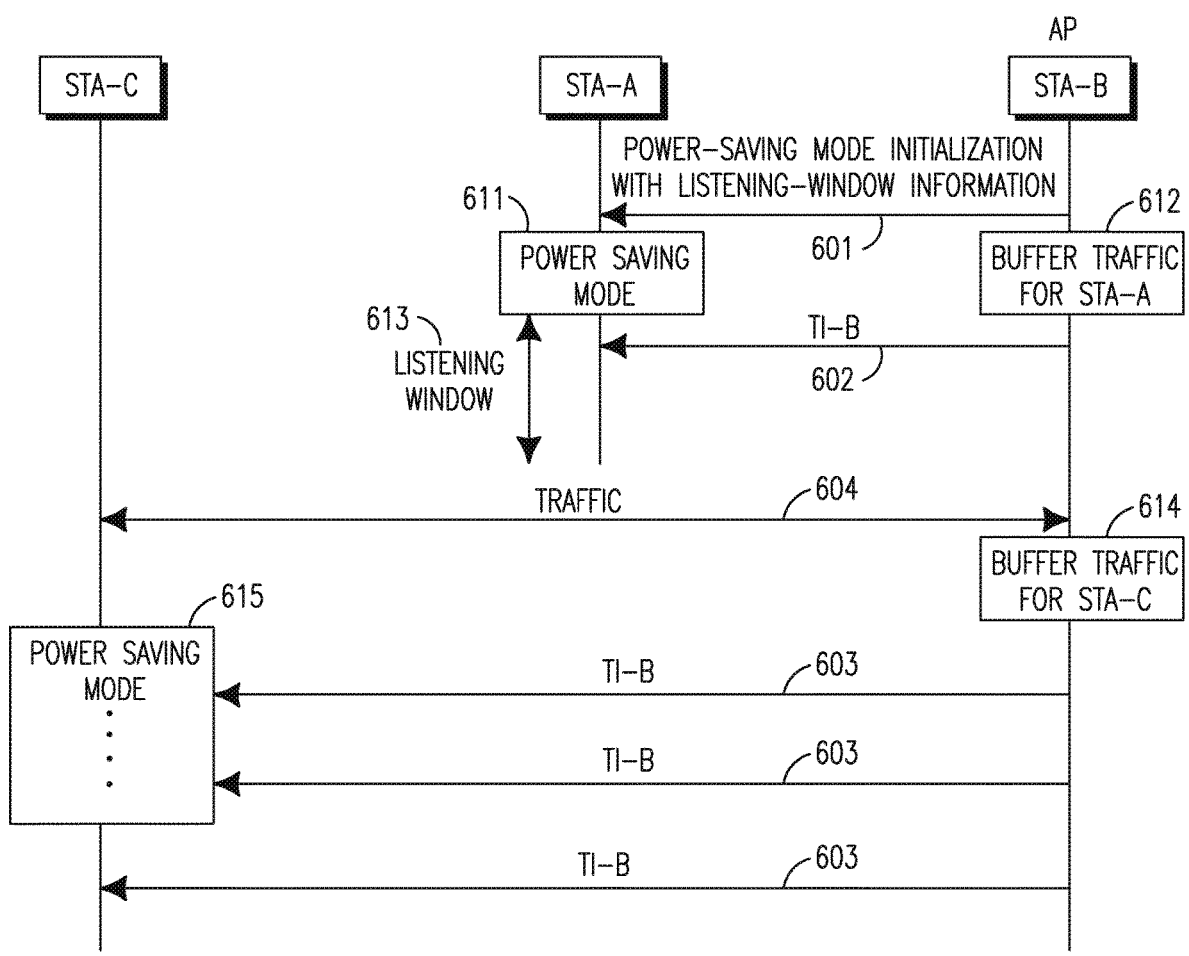
FIG. 6 shows example signalling diagram for a traffic indication beacon.

FIG. 6 shows an example signaling diagram for a procedure 600 relating to the traffic indication beacon 304, useful to support power saving operations. STA-A and STA-C communicate with STA-B configured as an AP. There are two basic types of traffic indication deliveries, depending on whether or not the transmitting STA of the traffic indication beacon knows the listening windows of the receiving STA or STAs, where the listening window refers to the time interval during which a power saving mode STA-A is "awake" (i.e., actively listening to the wireless channel). At the time a power saving mode is initiated and before the power saving station actually enters the power saving mode 611, STA-A may communicate 601 or negotiate its listening window information with another station STA-B that will deliver its traffic indications. STA-B buffers the traffic 612 for STA-A while STA-A sleeps. STA-B (the transmitting station of the traffic indication beacon 304) transmits 602 the traffic indication beacon 304 only in such known listening windows 613 in unicast manner for a single station or in multicast manner for a group of stations with the same listening windows. If STA-B does not know the listening windows of the intended receiving station STA-C or other receiving STAs, the traffic indication beacon 304 may be transmitted 603 periodically in a unicast or multicast or broadcast manner, where the periodicity may be defined by a system configuration parameter or parameters managed in IEEE 802dot11-MIB. Prior to transmitting 603 the traffic indication beacon 304, STA-B may buffer 614 the traffic 604.

The following description relates to rules for signaling the above described multiple level beacons. The same management frame may be used to carry or encode the multiple level beacons, e.g., the current beacon frame or a new category in the action frame or a new management frame by using a current reserved management frame subtype code point. In the new beacon frame, a Beacon Type field may be defined and sent to identify the different levels of beacon frames. The multiple level beacons may be encoded using the different management frames, e.g., using the current beacon frame for the Link Setup Beacon 301, using the a current management frame, e.g., probe response or authentication response or association response, to carry the Operation Initialization Beacon 302 information, using new categories in the action frame or new management frames for the other levels of beacon frames. The information for each level of beacon frame may be encoded as information fields or information elements, to include optimizations such as, e.g., encode the mandatory information in the form of information fields, not information elements. The system configuration parameters for the multiple level beacon scheme may be defined and also introduced into the IEEE 802dot11-MIB.

When applying the multiple level beaconing in backward compatible WLAN systems, in addition to supporting multiple level beacon capable STAs, legacy STAs that are not capable of multiple level beacon scheme may also be supported. In order to support legacy stations with the existing user experience of WLAN system performance, the current beacon frames are transmitted with the same information fields and elements at the same beacon interval as specified by the current IEEE 802.11 standards. In such a WLAN system, the multiple level beacon scheme may still be used to improve the beacon information provisioning and transmissions for the stations that are multiple level beacon capable.

In addition, the multiple level beacon scheme may also be used to improve the system performance for the legacy stations in the following scenarios. If the Link Setup Beacon 301 still uses the same beacon frame format as the legacy beacon, but with much less information IEs, then the legacy STA may still receive and decode the Link Setup Beacon 301, as the IE structure allows flexible inclusions of IEs due to the use of the Element ID and Length fields. In this way, the legacy STA during link setup may get the SSID and essential PHY link parameters from the Link Setup Beacons 301. Its link setup may be speeded up due to more frequent transmissions of the Link Setup Beacon 301, particularly, when the passive scanning has to be used, e.g., for regulatory reasons. After receiving and decoding a Link Setup Beacon 301, if the STA still needs more information about the AP, it may send a request message, e.g., Probe Request frame, to the AP. The traffic indication map (TIM) elements for the multiple level bacon capable stations are no longer included in the legacy beacons, so that the size of the legacy beacon will be reduced, as compared to a beacon containing a TIM for all the associated stations. Since the new Traffic Indication Beacon 304 may be transmitted in a multicast/unicast manner and also potentially in higher MCSs, the overall TIM transmission efficiency for all associated STAs may be improved.

The above methods related to multiple level beaconing offer improved utilization of system resources unlike a single beacon scheme in which the system description/configuration information is confined to a single beacon. Unlike a single beacon scheme, where the various information fields and information elements would be lumped together for delivery on a same transmission interval, the multiple level beaconing scheme reduces system overhead and is capable of efficiently provisioning and delivering a variety of information, e.g., usage, static/dynamic nature, and intended reception STA status, etc. to the STAs in the network.

In a second embodiment, a short beacon for transmission in multiple bandwidth systems is defined. A short beacon may carry only the essential information in order to reduce medium occupancy and power consumptions for transmission (TX) at AP and reception (RX) at STAs, compared to a normal standard beacon (also referred to herein as "long" beacon). For similar overhead as a long beacon, the short beacon may allow for shorter beacon intervals for better synchronization and power saving (e.g., by allowing STAs to sleep more). The short beacon may also perform primary beacon function, such as for example, announcing the AP, synchronizing the STAs, disclosing minimum set of information for TX in the BSS, and providing indication of Power Save (TIM). The short beacon may be defined to be <20 bytes.

AP/STA behavior with respect to short beacons may include the AP broadcasting regular beacons at a Beacon Interval and short beacons between the regular beacons. The STAs may acquire basic information about the AP through the short beacon, and only acquired at association by listening to full beacon or with a probe request. Once a STA is associated with the AP, it may listen to short beacons for synchronization. The AP may indicate change of information by adding a "change sequence" to the short beacon to force STAs to listen for a full beacon or through probe request.

Figure 7:
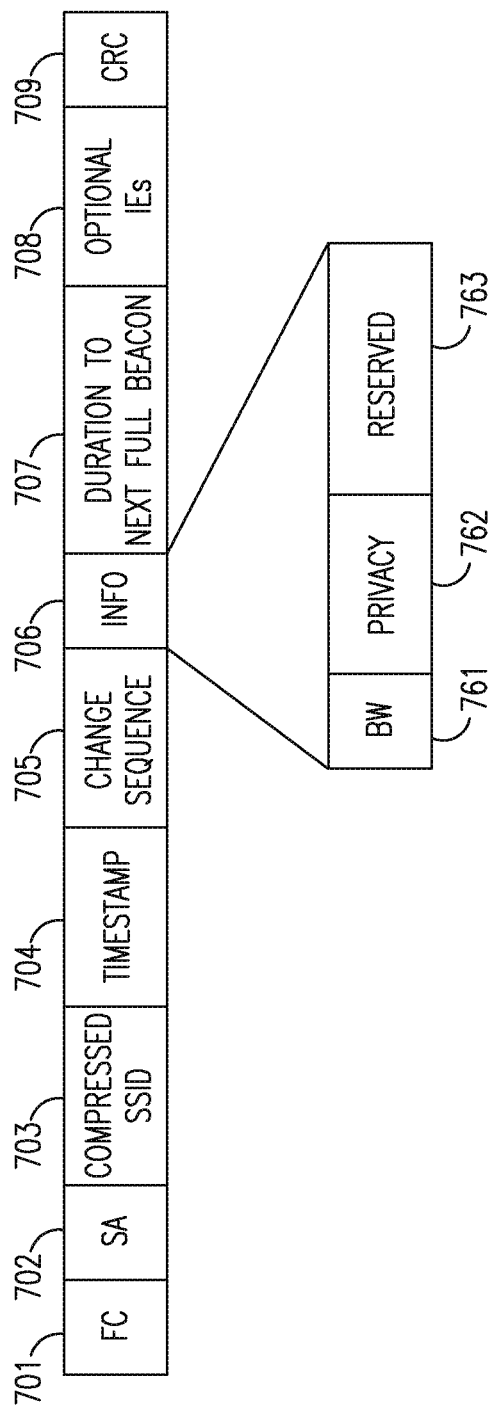
FIG. 7 shows an example short beacon configuration.

FIG. 7 illustrates contents for a short beacon 700, including a Frame Control field 701. An example of a Short Beacon indication in the Frame Control field 701 is a type/subtype field value of [B3 B2]=[11], [B7 B6 B5 B4]=[0 0 0 1]. A Source Address (SA) 702 may be included as MAC Address of the AP. A Compressed SSID 703 may contain a representation of the SSID of the network that allows a device that already knows the network to discover it and may for example be a standardized hash of full SSID. A Timestamp 704 that may be 4 byte least significant bits (LSBs) of the Timestamp at the AP. The 4 bytes may be sufficient to keep up synchronization for a device that is already associated with the AP and has received the full AP Timestamp once. A sensor node may maintain time sync with its AP if it checks a Short Beacon as rarely as once a day. The short beacon also includes a Change Sequence field 705 shown as 1 byte long and in which a counter is incremented if full beacon information changes.

An Info Field 706 of the short beacon 700 may carry information for a new device trying to associate, including, but not limited to the following. A Bandwidth field 761 of 4 bits, where for example, a value 0000 indicates 1 MHz BSSS and all other values represent a bandwidth that is twice the value indicated by the Bandwidth field. A Privacy field 762 of 1 bit to indicate if the network supports privacy. Additional bits 763 may be reserved for future functionality. The short beacon 700 also includes a Duration to Next Beacon field 707, optional IEs 708 and CRC field 709.

The WLAN in this embodiment may support more than one bandwidth mode. One such example is in the sub-1 GHz spectrum where there may be BSS support that allows operation of 2 MHz and 1 MHz bandwidth modes. While described with reference to 1 MHz and 2 MHz bands as an example, this embodiment may apply to other bandwidth combinations as well.

The following rules for short beacon transmission in various bandwidth modes may be used. In scenarios where only 1 MHz bandwidth transmission is supported, (e.g., because of spectrum allocation and regulations), the AP may transmit only 1 MHz primary beacon and 1 MHz mode short beacon. In scenarios where only 2 MHz bandwidth transmission is supported, (e.g., because of spectrum allocation and regulations), the AP may transmit only 2 MHz Primary Beacon and 2 MHz mode Short Beacon. In scenarios where 2 MHz bandwidth transmission is supported and 1 MHz bandwidth transmission is supported as well, (e.g., because of spectrum allocation and regulations), the AP (or STA in IBSS mode) may transmit: (a) a 2 MHz Primary Beacon and also a 2 MHz mode Short Beacon; or (b) a 1 MHz Primary Beacon and also a 1 MHz mode Short Beacon. In addition, depending on regulations, the 1 MHz primary beacon and 1 MHz mode short beacon may be transmitted: (a) in the upper 1 MHz of a 2 MHz band; or (b) in the lower 1 MHz of a 2 MHz band.

Note that a short beacon may be transmitted in any combination with the various bandwidth modes. Some examples of such combinations are: (1) non-STBC 1 MHz bandwidth mode; (2) STBC 1 MHz bandwidth mode; (3) non-STBC 2 MHz bandwidth mode; or (4) STBC 2 MHz bandwidth mode. The 1 MHz short beacon may be transmitted at a known time offset from: (1) the 1 MHz primary beacon; (2) the 2 MHz primary beacon; or (3) the 2 MHz short beacon.

An AP, (or STA in IBSS mode), may use a basic MCS (modulation and coding set) from a basic MCS set that is specified in the system to transmit a non-STBC beacon frame. Such a basic MCS set may be advertised by the primary beacon.

The above described methods related to the short beacons enable WLAN systems based on new PHY, and MAC, extensions targeted for smaller bandwidth transmissions to support more than one bandwidth mode with corresponding short beacons to support transmission in each bandwidth mode.

In a third embodiment, a short beacon for fast initial link setup (FILS) may provide information to speed up each of the link setup phases. A FILS beacon, which is another form of short beacon to speed up AP discovery, may carry necessary information for AP discovery. The FILS beacon may be utilized during a WLAN link setup process. Since beacons are part of the primary tools to provide information about the AP to the STAs at the very beginning of the initial link setup process, beacons may include information that may facilitate a speedy link setup in order to satisfy functional requirements. The FILS process may include the following five phases: 1) AP Discovery; 2) Network Discovery; 3) Additional time synchronization function (TSF); 4) Authentication and Association; and 5) Higher Layer IP Setup. The FILS beacon may advertise the AP and may contain several necessary elements for discovery. The FILS beacon does not replace the traditional beacon frame, but rather is to be sent much more frequently between traditional beacons.

Figure 8:
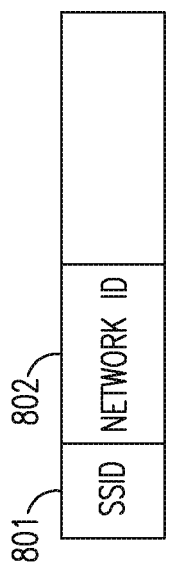
FIG. 8 shows an example FILS beacon configuration.

FIG. 8 shows an example configuration for a FILS beacon 800 that includes an SSID field 801, and an optional Network Identifier 802. The transmit pattern of the FILS beacon may be a predefined set of transmit modes, and where one mode is randomly chosen, for example, evenly set six time points within a beacon period. Another pattern may be based on setting a time length T, where AP may send out a FILS beacon if it does not receive any of beacon, Probe Response or FILS beacon for T. A pattern may be periodically transmitted at a frequency higher than beacon. If transmit time is overlapped with beacon, only beacon may be transmitted.

An enhanced FILS beacon is defined that speeds up the link setup process. The methods are also applicable to other WiFi systems that transmit frames carrying a subset of the information in the full beacon, for example IEEE 802.11ah. A description is provided herein for information that may be included for each of the link setup steps below. For FILS purpose, the information included in the following section that can speed up each of the link setup phases may be used alone and without other information or may be used in any combination or subset of the remainder of the information. The terms FILS beacon, FILS short beacon and FILS discovery frames may be used interchangeably.

The phases of AP Discovery and Network Discovery in the FILS process may be combined into one single phase since the ultimate purpose is for STAs to discover APs with appropriate network services.

Figure 9:
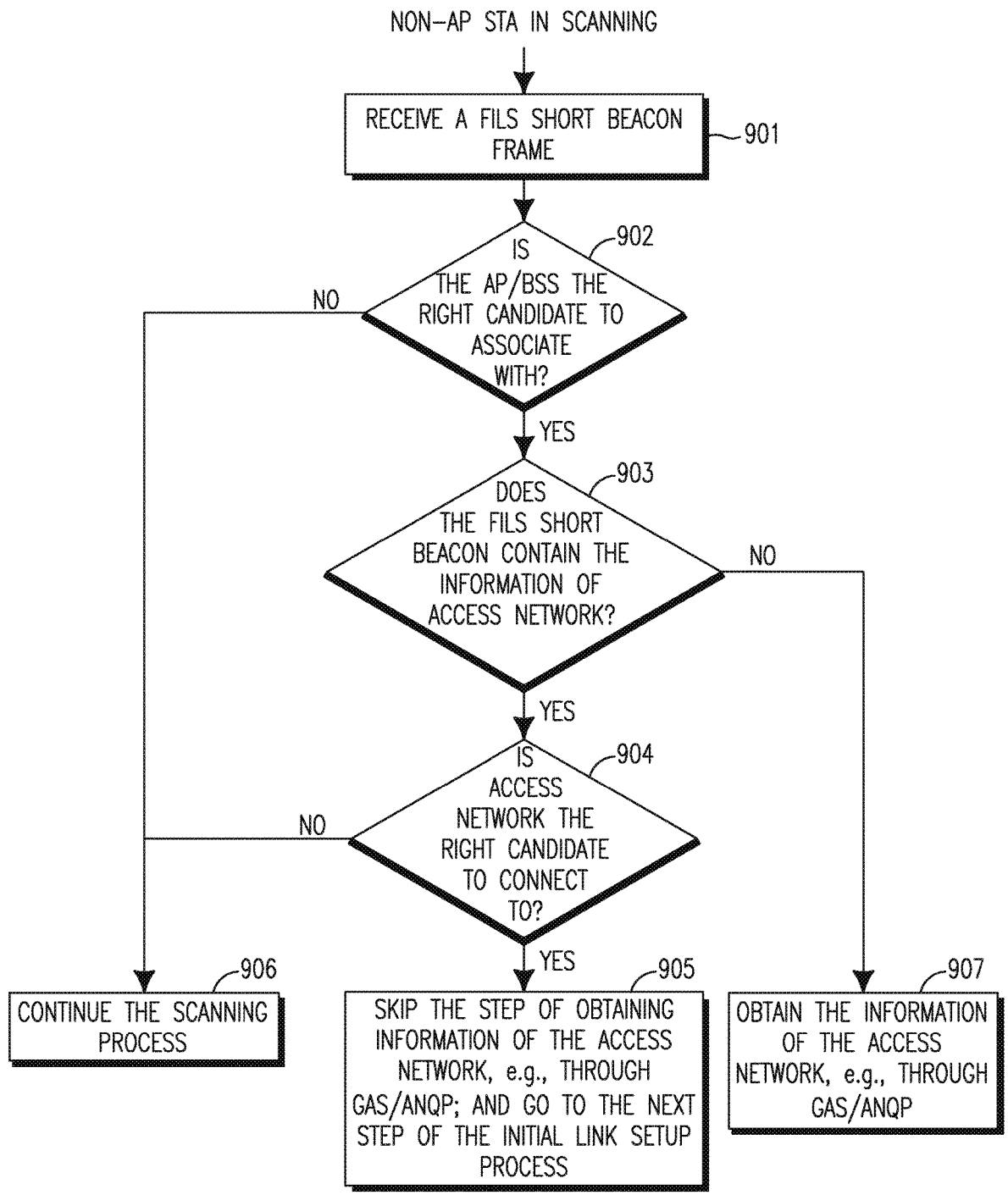
FIG. 9 shows an example method flowchart for a single discovery phase using a FILS short beacon.

FIG. 9 shows an example method flowchart 900 for combining a single AP/BSS and network discovery phase with a FILS short beacon. While scanning, a non-AP STA receives 901 a FILS short beacon frame. The STA determines 902 whether the AP/BSS is the right candidate to associate with. If not, the STA continues scanning 906. If the AP/BSS is appropriate, then the STA determines 903 whether the FILS short beacon contains the information of the access network. If not, then the STA obtains 907 the information of the access network using, for example, the General Advertisement service/Access Network Query Protocol (GAS/ANQP). However, if at 903, the STA detects the information in the FILS shot beacon, then the STA checks 904 whether the access network is the correct candidate to connect to. If so, then the STA proceeds 905 to the next step of FILS process without having to obtain the access network information via regular mechanisms, such as GAS/ANQP. However, if the STA determines that the access network is not the appropriate candidate, then the STA continues the scanning process 906.

FIG. 10 shows a FILS short beacon that may include, besides the basic information on the BSS that a STA would require to be associated with the AP, (such as supported rate, beacon interval, etc.), Interworking 1001, Advertisement Protocol 1002 and Roaming Consortium 1003 Information Elements (IE). In addition, information on the network services may be included in the FILS short beacon. For example, the FILS short beacon may include the network type information, (private, public and the like), IP address availability 1004, operator's domain name 1005, Network Access Identifier (NM) Realm List 1006, 3GPP Cellular Network information 1007, and the like, so that the STA may skip the Advertisement Protocol packet exchanges over GAS and directly proceed to the next phase of FILS.

The FILS short beacon from an AP may also include a list of APs 1008 (or BSS's) that have similar network services as the transmitting AP. For example, the FILS short beacon from an AP of a particular provider may include a list of APs from the same provider in the immediate area. In this way, passive or active scanning to these APs may be skipped by newly arriving STAs which may significantly reduce the initial link setup time.

The FILS short beacon may also include, besides providing a Timestamp 1009 or for example, 32 LSB of the Timestamp, along with basic information of the BSS network service the AP provides. Once a STA identifies the appropriate AP with the appropriate network service, it may adapt the TSF from the FILS short beacon to perform the TSF. One round of packet exchanges may be skipped and the STA may directly proceed to the next step of Authentication and Association.

Alternatively, the FILS short beacon may not include all network services related information, but it includes some key information to allow the STA to quickly screen out undesired AP/BSS in terms of network services characteristics and reduces the candidate network that the STA needs to perform QAS query in the network discovery phase. By receiving the FILS short beacon, the STA may screen out undesired AP/BSS by checking network services related information in the FILS beacon. For example, a STA that uses an IPV6 address finds out the "Address type not available" for IPV6 in the FILS beacon received from a particular AP, then it may not perform the QAS query to the network of this AP.

The FILS short beacon or discovery frame may include information on authentication, for example, as a part of the NAI Realm List, such as acceptable credential types and EAP methods. Alternatively, a FILS discovery frame may include such information in the Network Authentication Type information.

The FILS short beacon may also include information on Higher Layer IP Setup, such as IP Address Type Availability information 1010.

The address 3 field in the MAC header of the FILS discovery frame may be omitted. The recipient may still obtain the BSSID (MAC address) from the source address (SA) field in the MAC header of the FILS discovery frame.

The following scan primitives are defined with respect to MAC layer management entity (MLME) for implementing the FILS short beacon. The MLME-SCAN.confirm primitive may be immediately invoked to report on every found BSS during the scan procedure. Table 1 shows a first field that may be contained in the MLME-SCAN.confirm primitive.

TABLE 1

| Name | Type | Valid Range | Description |
|---|---|---|---|
| BSSDescriptionFromFILSDiscoveryFrameSet | Set of BSSDescriptionFromFILSDiscoveryFrame | N/A | The BSSDescriptionFromFILSDiscoveryFrameSet is returned to indicate the results of the scan request derived from FILS Discovery Frame. It is a set containing zero or more instances of a BSSDescriptionFromFILSDiscoveryFrame. Present only if the value of dot 11FILSActivated is true. |

Each BSSDescriptionFromFILSDiscoveryFrame may consist of the elements shown in Table 2.

TABLE 2

| Name | Type | Valid Range | Description |
|---|---|---|---|
| Compressed SSID | Octet string | 0-4 octets | The hashed SSID of the found BSS |
| Short timestamp | Integer | N/A | The 4 byte LSBs of the Timestamp of the received frame (probe response/beacon) from the found BSS |
| Time to the next full beacon | Integer | N/A | The time between the received FILS discovery frame to the next full beacon |
| MAC Address of the AP | MAC address | 6 bytes | MAC Address of the AP is obtained from the Source address (SA) in the received FILS discovery frame |
| FILS Discovery (FD) Interval | Integer | N/A | basic periodicity of FILS Discovery frames, in units of TUs (i.e., 1024 us) |
| Condensed Country string | As defined in IEEE Std 802.11 ™-2012: Wireless LAN Medium Access Control (MAC) and Physical Layer (PHY) Specifications | N/A | uses the same 2-byte condensed country string as in MP frame; although 3 bytes in dot11CountryString |
| Operation class | As defined in IEEE Std 802.11 ™-2012: Wireless LAN Medium Access Control (MAC) and Physical Layer (PHY) Specifications | N/A | indicates the operating class value for the operating channel, as defined in Annex E. |
| Operation channel | As defined in IEEE Std 802.11 ™-2012: Wireless LAN Medium Access Control (MAC) and Physical Layer (PHY) Specifications | N/A | indicates the operating channel, as defined in Annex E. |
| Power constraints | As defined in IEEE Std 802.11 ™-2012: Wireless LAN Medium Access Control (MAC) and Physical Layer (PHY) Specifications | N/A | the information necessary to allow a STA to determine the local maximum transmit power in the current channel. |
| Access network type (optional) | As defined in IEEE Std 802.11 ™-2012: Wireless LAN Medium Access Control (MAC) and Physical Layer (PHY) Specifications | 4 bits | The type of access network (such as public, private and etc.) |
| Condensed NAI Realm List or Network Authentication Type information (optional) | As defined in IEEE Std 802.11u ™-2011 | N/A | Authentication methods and types of acceptable credentials |

TABLE 2-continued

| Name | Type | Valid Range | Description |
|---|---|---|---|
| Condensed Roaming consortium (optional) | As defined in IEEE Std 802.11u ™-2011 | N/A | Identifying the roaming consortium and/or SSP whose security credentials can be used to authenticate |
| IP address availability or condensed IP address availability (optional) | As defined in IEEE Std 802.11u ™-2011 | N/A | Availability of IP address of various types of the found BSS |

For the MLME-Scan.request primitive, two new parameters MaxChannelTimefor-FILSDiscoveryFrame and MinChannelTimeforFILSDiscovery-Frame in the MLME-Scan.request primitive may be added. These are shown in Table 3.

TABLE 3

| Name | Type | Valid Range | Description |
|---|---|---|---|
| MaxChannelTimeforFILSDiscoveryFrame | Integer | ≤MaxChannelTime | The maximum time (in TU) to spend on each channel when scanning for FILS discovery frame, and is optionally present if the dot11FILSActivated is true. |
| MinChannelTimeforFILSDiscoveryFrame | Integer | ≤MaxChannelTime | The minimum time (in TU) to spend on each channel when scanning for FILS discovery frame. This may be optionally present if the dot11FILSActivated is true. |

Alternatively, the immediate invoke of MLME-Scan.confirm to report on every found BSS during the scan procedure may be configured/requested by adding a new parameter/field called ReportOption in the MLME-Scan.request primitive, as shown in Table 4.

TABLE 4

| Name | Type | Valid Range | Description |
|---|---|---|---|
| ReportOption | Enumeration | Regular_Report, Immediate_Report | Indicates the option to report (passive or active) scan results. If Regular_Report, it indicates the STA may follow the same procedure to report scan results as in current standards. IEEE Std 802.11 ™-2012: Wireless LAN Medium Access Control (MAC) and Physical Layer (PHY) Specifications If Immediate_Report, it indicates the STA may immediately invoke an MLME-Scan.confirm primitive to report on every found BSS during the scan procedure. |

The scanning STA may report the found BSS/AP according to the ReportOption parameter in the corresponding MLME-Scan.request primitive.

A FILS short beacon may be implemented according to the following. The FILS short beacon may be implemented with the same management frame or a new management frame or action frame. The FILS short beacon may be implemented as a broadcast/unicast frame. The additional information included in the FILS short beacon may be implemented as existing IEs such as Interworking, Advertisement Protocol and Roaming Consortium IEs, or one or more new IE(s) containing all or a subset of information on internetworking, advertisement protocol, roaming consortium, operator's domain name, NM Realm List, 3GPP Cellular Network information, Timestamp, IP Address Type Availability, Network Authentication Type information or other information related to AP Discovery, Network Discovery, Additional TSF, Authentication and Association and Higher Layer IP Setup.

A FILS enabled AP may transmit FILS short beacons, which contain either all or a subset of the information that may facilitate fast initial link setup for one or more phases, in addition to the basic BSS information such as supported data rates, beacon interval, and the like. A STA that performs passive scanning may use a hashing function to obtain the compressed service set ID (SSID) from the full SSID to calculate the hashed SSID from SSID or SSIDList parameter in the MLME-SCAN.request primitive and to compare it with the received compressed SSID.

To become a member of a particular extended service set (ESS) using passive scanning, a STA may scan for beacon frames containing that ESS's SSID, returning all beacon frames matching the desired SSID in the BSSDescriptionSet parameter of the corresponding MLME-SCAN.confirm primitive with the appropriate bits in the Capabilities Information field indicating whether the beacon frame came from an infrastructure BSS or independent BSS (IBSS).

If the value of dot11FILSActivated is true, the STA may additionally scan for FILS Discovery frames, returning all Discovery frames matching the desired parameters, (such as SSID and the like), in the corresponding MLME-SCAN.request primitive using BSSDescriptionFromFILSDiscoveryFrameSet in the MLME-SCAN.confirm primitive. For example, a Discovery frame may be considered to be matched with the desired parameters in the corresponding MLME-SCAN.request primitive when the compressed SSID of received FILS Discovery frames matches the hashed SSID or SSIDList parameter (if they are specified in the corresponding MLME-SCAN.request primitive).

The STA may listen to each channel scanned for no longer than a maximum duration defined by the MaxChannelTime parameter. Alternatively, a STA may listen to each channel scanned for no longer than a maximum duration defined by the MaxChannelTime_FILS parameter, (as defined herein). In addition a STA may listen to each channel scanned for no less than a minimum duration defined by the MinChannelTime_FILS parameter (as defined herein).

Figure 11:
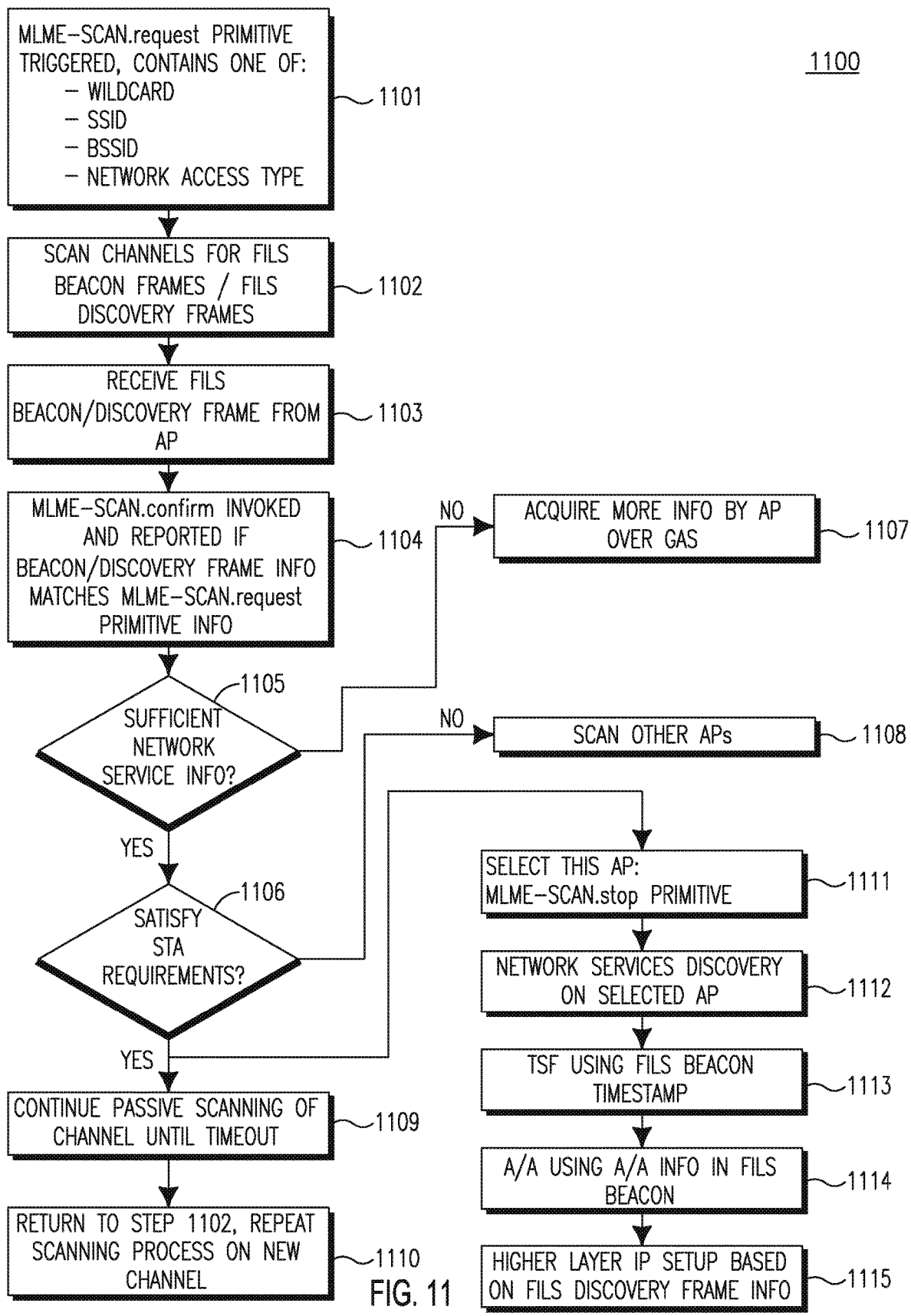
FIG. 11 shows an example method flowchart for STA behaviour using scanning primitives for FILS short beacon.

FIG. 11 shows a method flowchart for an example procedure that the FILS enabled STA may follow. The FILS enabled STA may skip or simplify/optimize certain FILS phases according to the information available in the FILS information contained in the FILS short beacon.

The following MLME primitives are processed by the STA's MAC sublayer and MLME. Upon receipt of the MLME-SCAN.request primitive 1101 with ScanType indicating passive scan, a STA may perform passive scanning on each channel included in the ChannelList parameter in the MLME-SCAN.request primitive. The FILS enabled STA scans the channel 1102 for beacons/FILS Discovery frames if at least one PHY-CCA.indication (busy) primitive has been detected before the ProbeTimer reaches MinChannelTimeforFILSDiscoveryFrame, and until the MaxChannelTimefor FILSDiscoveryFrame elapses. If a FILS enabled STA receives a FILS beacon (or Discovery frame) 1103 from an AP, then the following may apply.

A MLME-SCAN.confirm primitive may be invoked and reported 1104 for every BSS found using BSSDescriptionFrom_FILSDiscoveryFrameSet depending on the parameters such as SSID, SSIDList and/or access network type in the MLME-SCAN.request primitive. A MLME-SCAN.confirm primitive may be invoked and reported 1104 for every BSS found if a wildcard SSID and a wildcard access network type are used in MLME-SCAN.request primitive. If the MLME-SCAN.request primitive specifies a SSID or a SSID List, then the STA may compute the hash of the SSID or SSIDs in the SSID list and compare with the received compressed SSID. If not matched, the STA may choose not to invoke a MLME-SCAN.confirm primitive. If matched, a MLME-SCAN.confirm primitive is invoked and reported 1104. If the MLME-SCAN.request primitive specifies a BSSID, then the STA may compare the requested BSSID with the SA field of the received FILS Discovery frame. If not matched, the STA may choose not to invoke a MLME-SCAN.confirm primitive. If matched, a MLME-SCAN.confirm primitive is invoked and reported 1104. If the MLME-SCAN.request primitive specifies a particular access network type, then the STA may compare the received network access type field in the received FILS discovery frame with the access network type in the MLME-SCAN.request primitive. If not matched, the STA may choose not to invoke a MLME-SCAN.confirm primitive. If matched, a MLME-SCAN.confirm primitive is invoked and reported 1104.

The FILS enabled STA, (or the station management entity (SME) within the STA), may evaluate the received MLME-SCAN.confirm primitive, (or the received FILS beacon), and determine whether the basic BSS requirements in the FILS beacon may be supported by itself and whether there is sufficient network service information 1105. If there is no or not sufficient network service information and the basic BSS requirements can be supported, then more information may be requested/acquired 1107 through Advertisement Protocol packet exchanges over GAS as indicated by the FILS.

If there is sufficient network service information and the basic BSS requirements can be supported, however, the provided network service does not satisfy the STA's requirements 1106, then the STA may not perform network discovery or association with the found AP, and may continue to scan 1108 for other suitable APs. The STA may consider that the provided network service does not satisfy the STA's requirements if one or any combination of the following example conditions are met: (1) the SSP whose networks are accessible via the AP or the roaming consortium, (group of SSPs with inter-SSP roaming agreement), is not the preferred network/operator/supplier of the STA; (2) the IP address type that the STA supports is not available, (for example, IPv4 address not available and the STA is a IPV4 only STA); or (3) authentication methods and acceptable credentials are not the preferred ones of the STA. Additionally, if the FILS beacon contains information on more APs which provides similar network service, the STA may not perform network discovery or association with these listed APs and continue to scan for other suitable APs.

If there is sufficient network service information and the basic BSS requirements can be supported, and the provided network services match the requirement of the STA, the STA may decide to select this AP to associate with, and skip the network services discovery 1112 and proceed to TSF 1113, described below.

After evaluating the received MLME-SCAN.confirm primitive, the STA, (or the SME within the STA), may decide to stop entire passive scanning on all channels or continue to scan for other suitable APs. If the SME decides to stop the ongoing passive scanning, it may proceed to step 1111. If the SME decides to continue the ongoing passive scanning, it may proceed to 1109.

The STA, (or the SME within the STA), may generate a MLME-SCAN.stop primitive 1111, with the field of ScanStopType being set to "Stop_All". Upon receiving the MLME-Scan-STOP.request primitive, the STA (via the MLME) may cancel passive scanning on this channel and may generate an MLME-SCAN.confirm primitive with the BSSDescription-FromFILSDiscoveryFrameSet containing all of the received information of the channels/BSSs. Then the STA may proceed to network services discovery 1112, or directly to TSF 1113.

The STA may continue to search for FILS discovery frames on the current channel until the MaxChannelTimeforFILSDiscoveryFrame elapses 1109. When the scan time reaches MaxChannelTimeforFILSDiscoveryFrame, the STA may stop scanning of the channel, may generate an MLME-SCAN.confirm primitive to report scan results, and repeat the above scanning process on the next channel 1110.

The network services information in the above may be obtained from the received FILS Discovery frames, (broadcast) Probe Response frames or other management frames.

The STA may perform network services discovery (GAS query) with the selected AP(s) 1112. If some (but not all) network services information has been received in previous steps, the STA may optimize the GAS query with the network by: (a) skipping APs that has network services that the STA cannot not use/support or does not prefer; (b) not performing GAS query of network services information that are already acquired from FILS discovery frames in previous steps. The STA may conduct timing synchronization function (TSF) 1113 using the Timestamp contained in the FILS beacon. The STA may conduct Authentication/Association 1114 using the information contained in the FILS beacon on authentication/association. If parallel or concurrent operation of authentication/association and Higher Layer IP Setup is supported, then Higher Layer IP Setup procedures performed concurrently may use the IP Address Type Availability information acquired from FILS discovery frames in previous steps. For example, if IPv4 address is not available but IPv6 address is available, then the concurrent Higher Layer IP Setup procedures may use IPv6 address type (e.g., IPv6 address type is requested in the IP-CFG-REQ message).

The STA may conduct Higher Layer IP Setup 1115 using the IP Address Type Availability information acquired from FILS discovery frames in previous steps.

According to the above described methods related to the FILS beacon, the FILS short beacon, and FILS discovery frames, WLAN systems are enabled to support faster link setup for STAs, (e.g. less than 100 ms), and to support a much larger number of STAs than conventional FILS schemes as the STAs enter the BSS at the same time. The above embodiment related to FILS may enable a WLAN to support more than 100 STAs, and also may provide fast link setup within 1 second.

According to the following embodiment, a primary beacon may be modified to support a short beacon feature. Specifically the primary beacon needs to carry short beacon related information. An example illustration of such a modified primary beacon 1200 is shown is FIG. 12. STAs receiving the modified primary beacon 1200 may read the short beacon related information field(s) 1201 in the modified primary beacon 1200 to determine how to receive the short beacon. Such information may include one or more of an indication of transmission or presence of a short beacon 1202, a short beacon transmission time information 1203 (e.g., in the form of absolute time, time offset from the primary beacon etc), periodicity of the short beacon (how frequently it is transmitted) 1204, an indication of transmission or presence of STBC mode and non-STBC modes of the short beacon 1205, an indication of transmission or presence of short beacon in bandwidth mode 1 MHz 1206, and an indication of transmission or presence of a short beacon in bandwidth mode 2 MHz 1207. While bandwidth modes for 1 MHz and 2 MHz are shown in this example, other bandwidth mode values may be alternatively implemented.

The short beacon related information may be included in any part of the primary beacon frame. In one embodiment it may be included in a newly created short beacon information element to be carried in the primary beacon. The short beacon related information may be included as part of an Operation element of the primary beacon where the Operation element is used by the AP to control the operation of STAs in the BSS. In this case the STAs receive the short beacon information by interpreting the Operation element in the received primary beacon. The primary beacon may be transmitted by an AP, (or STA in IBSS mode), in non-STBC mode and also in an STBC mode.

In another embodiment, multiple bandwidth modes may be supported by a WLAN with respect to a primary beacon. One such example is in the sub-1 GHz spectrum where there may be BSS support that allows operation of 2 MHz and 1 MHz bandwidth modes. While the embodiments described herein are with respect to 1 MHz and 2 MHz, they apply to other bandwidth combinations as well.

In systems where more than one bandwidth is supported, there may be a primary beacon transmitted corresponding to each of the bandwidth modes. For example, the primary beacon may be transmitted in either a 2 MHz bandwidth mode or a 1 MHz bandwidth mode in systems operating in the sub-1 GHz frequency band. The primary beacon in each bandwidth mode would include beacon information that is specific to that bandwidth mode to support transmission in that bandwidth mode. The primary beacon may be transmitted with signaling of associated bandwidth mode information. This associated bandwidth mode information may be included in PHY portion of the primary beacon and may also be included in the MAC portion of the primary beacon.

In the PHY portion of primary beacon the associated bandwidth mode information may be, for example, in the Signal field of the PHY preamble and may, for example, include bandwidth indication with other bandwidth mode information to decode bandwidth transmission format. For example, such information may be signaled explicitly using a specific bit(s)/field. When a primary beacon is transmitted, a STA decodes the preamble signal field in the PHY header to obtain the bandwidth mode information. In another embodiment, the associated bandwidth mode information may be signaled implicitly by the specific type of training field(s) used in the PHY preamble. In this case, a STA receiving the primary beacon may obtain the bandwidth mode indication by processing the training field(s). If the bandwidth mode information, (obtained by processing the preamble signal field or training fields), indicates that the primary beacon frame is of a specific bandwidth mode then: (1) a STA not capable of receiving that bandwidth mode ignores the rest of the primary beacon frame; and/or (2) a STA capable of receiving that bandwidth mode proceeds to decodes the frame to receive the full frame of the primary beacon.

In the MAC portion of the primary beacon the associated bandwidth mode information may be for example in the frame body of the primary beacon and may for example indicate one or more of: (1) the primary beacon carrying this indication is of a specific bandwidth mode (e.g., either a 1 MHz or 2 MHz); (2) the bandwidth modes in which the primary beacon is transmitted/supported, (e.g., 1 MHz and 2 MHz modes). An STA that decodes the MAC portion of the primary beacon: (1) on seeing an indication that it is of a specific bandwidth mode, (e.g., either a 1 MHz or 2 MHz), may treat the contents of the primary beacon as associated with that bandwidth mode; and/or (2) on seeing the bandwidth modes being transmitted/supported may be aware of the various bandwidth modes of the primary beacon being transmitted/supported.

The 1 MHz primary beacon may be transmitted at a known time offset from the 2 MHz primary beacon when both bandwidth modes are in operation. Based on regulatory needs, the 1 MHz primary beacon and 1 MHz mode short beacon may be transmitted: (1) in the upper 1 MHz of a 2 MHz band; and/or (2) in the lower 1 MHz of a 2 MHz band.

According to the above described embodiment related to primary beacon support for short beacon, WLAN systems that are based on new PHY, and MAC, extensions targeted for smaller bandwidth transmissions may also support more than one bandwidth mode with corresponding primary beacons to support transmission in each bandwidth mode.

In another embodiment, short beacons may support various modes of transmission. Some WLAN systems may support more than one mode of transmission, such as STBC or non-STBC modes. STAs operating in various modes may need support from the AP in the form of short beacons in various modes to operate efficiently in the BSS. The short beacon may be modified to support various modes, (e.g., STBC and non-STBC), and carry mode related information.

The short beacon may be transmitted in a non-STBC mode and a STBC mode when both non-STBC and STBC modes are supported in the system. The short beacon may also carry an indication of whether it is being transmitted in a STBC mode or non-STBC mode. This STBC mode indication may be included in PHY preamble of the short beacon, and may also be included in the MAC portion of the short beacon for example in the frame body of the short beacon as part of short beacon specific information.

In the PHY portion of the short beacon, the associated STBC information may be for example in the Signal field of the PHY preamble and may for example include STBC indication with additional information to decode the STBC modulation. When a STBC short beacon is transmitted, a STA decodes the preamble signal field in the PHY header. If the preamble signal field indicates that it is an STBC frame then: (1) a non-STBC STA, (not capable of receiving STBC frames), ignores the rest of the frame; and/or (2) an STBC STA (capable of receiving STBC frames), interprets and decodes the frame to obtain the STBC short beacon.

In the MAC portion of the short beacon, the associated STBC information may be for example in the frame body of the short beacon and may for example indicate one or more of: (1) the short beacon carrying this indication is an STBC or a non-STBC short beacon; and/or (2) both STBC and non-STBC modes short beacon are transmitted/supported. A STA that decodes the MAC portion of the Short beacon: (1) on seeing an indication that it is an STBC or non-STBC short beacon may treat the contents of the short beacon as that of an STBC or non-STBC short beacon, respectively; and/or (2) on seeing the indication of whether both STBC and non-STBC modes of the short beacon are transmitted/supported may be aware of that information.

The STBC mode of operation for the short beacon may also be implicitly associated with the bandwidth of operation. For example, if a 1 MHz only bandwidth mode of operation is used only a non-STBC mode of operation may be used for the short beacon.

Figures 12, 13:
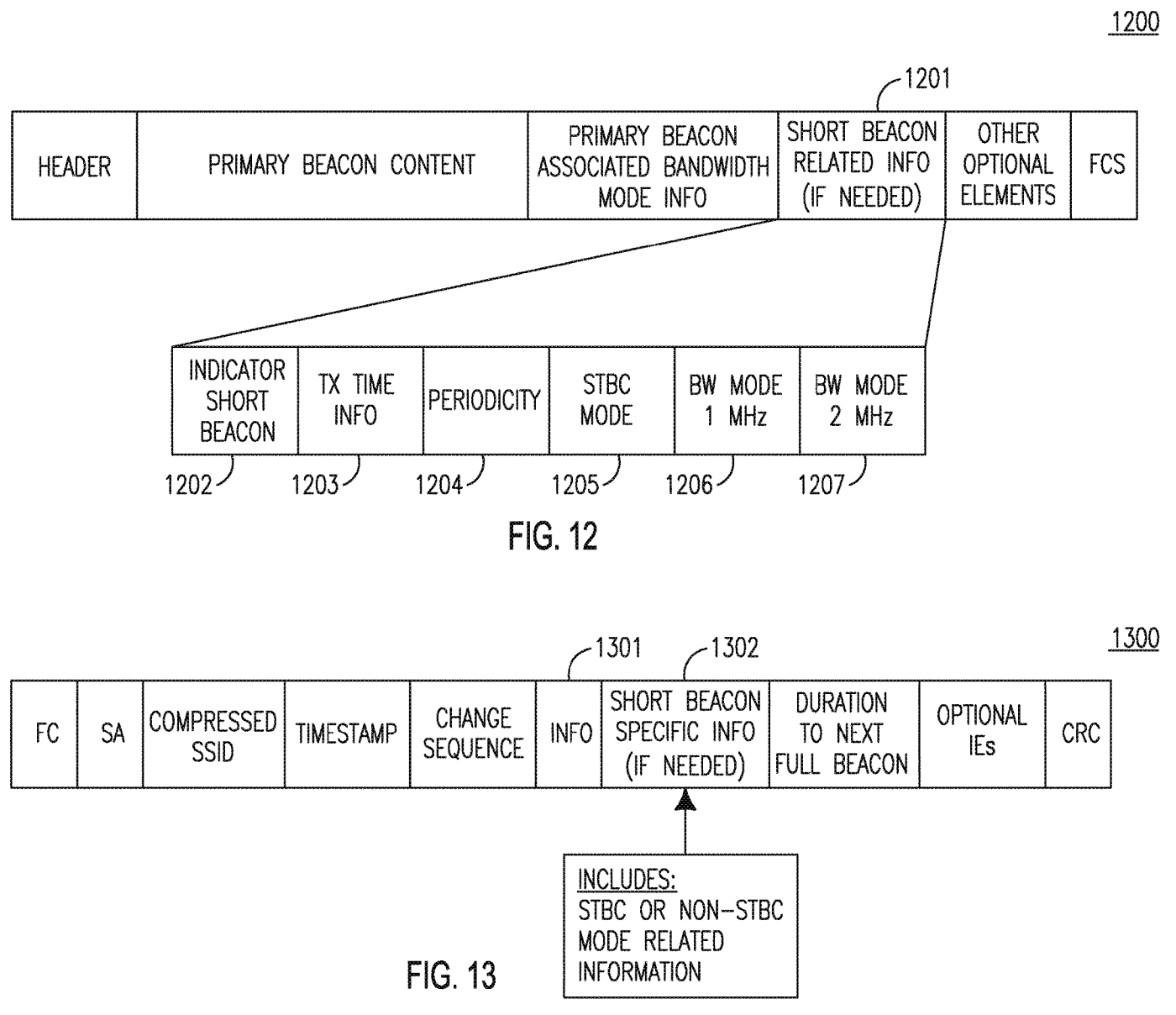

In FIG. 13, an example of a modified short beacon frame 1300 is shown having STBC or non-STBC mode related information contained in the frame body. This information may be included anywhere in the frame body, such as in the Info field 1301, the Short Beacon Specific Info field 1302 (as shown), a new field, and/or in any of other field of the frame body.

Figure 14:
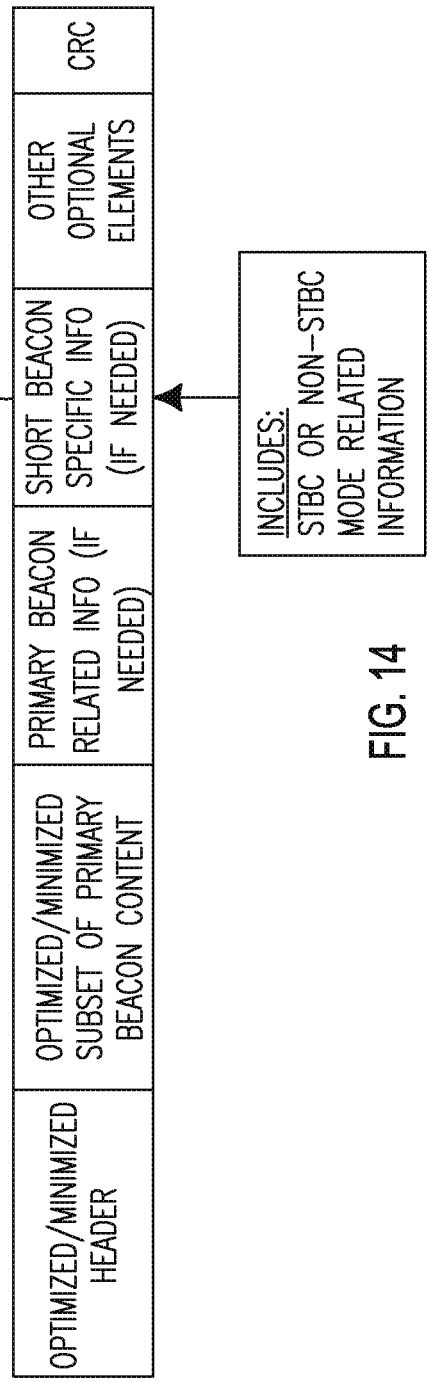
FIG. 14 shows an example modification to a general short beacon frame to carry STBC or non-STBC mode related information.

In FIG. 14, an example of a short beacon frame 1400 is shown having STBC or non-STBC mode related information contained in the short beacon field 1401. However, this STBC mode information may be included anywhere in the frame body of the short beacon frame 1400.

An AP, (or STA in IBSS mode), may use a basic STBC MCS from a basic STBC MCS set that is specified in the system to transmit an STBC beacon frame. The STBC short beacon may be transmitted at a known or advertized time (e.g., advertized by the primary beacon), such as for example at an offset from non-STBC short beacon, at an offset from the non-STBC primary beacon; and/or at an offset from the STBC primary beacon.

According to the above described embodiment related to primary beacon bandwidth modes, WLAN systems based on new PHY, and MAC, extensions targeted for smaller bandwidth transmissions are enabled to also support more than one mode of transmission, for example non-STBC and STBC modes. Specifically STAs in both non-STBC and STBC modes may be supported by the BSS. In contrast, systems relying only on a primary beacon in STBC mode to provide beacon information in the BSS would result in high system overhead.

In another embodiment, an appropriate MCS, (higher than the lowest supported MCS), may be chosen and used for a beacon transmission without compromising the purpose of that beacon. In this way, it may provide reduced medium occupation time in each beacon interval, increase medium access efficiency and provide power saving for both the transmitting APs and the receiving STAs.

The short beacon used to indicate the presence of the AP and the BSS may be transmitted using the lowest MCS contained in the support rates set. In order to provide information for all potential STAs that may associate with the AP, the short beacon may be transmitted with the most robust data rate.

Short beacons for the STAs that are already associated with the AP do not have to be transmitted using the lowest and most robust MCS since the AP already has information on these STAs. The MCS used for associated STAs may depend on which group the short beacon is meant for. The MCS selection criteria for an AP to transmit beacons may include the criteria described in the following sections.

The STAs in the BSS may be grouped based on their RSSI level recorded at the AP. For example, in a BSS where there are a large number of STAs, the STAs may be divided into groups and some of the groups are put into sleep while the other groups are awake to listen for beacons or to transmit and receive packets. If the groups are divided into groups by binning the RSSI levels of STAs, then short beacons meant for one particular group of STAs (e.g., short beacons with TIM for this group of STAs only), may be encoded using a MCS that is robust for the RSSI bin associated with the group of STAs. This may be particularly useful if the STAs are immobile STAs such as sensors.

The STAs in the BSS may be grouped based on their STBC capabilities. An AP may also divide the STAs into groups according to their STBC capabilities. Short beacons meant for one particular group of STAs, for example, short beacons with TIM for the group of STAs that are capable of STBC only, may be encoded using the lowest STBC MCS that may be supported by all the STAs in the group.

In accordance with the above described methods for beacon MCS adaptation, a result is reduction in system overhead caused by beacon transmission forced to use the lowest MCS supported in the BSS. Hence, WLAN systems including those based on new PHY and MAC extensions targeted for smaller bandwidth transmissions (e.g., TGah), can benefit.

Short beacons may be used for support of increased range and coverage in WLAN systems, particularly those designed for sub-1 GHz operation. Specifically two methods are described below to extend the short beacon range. A first method uses a lower and/or variable rate for transmission of the short beacon, and a second method uses multiple antenna techniques, such as beamforming, and associated procedures, to extend the transmission range. Both methods result in minimizing increased system overhead. Each of these range extension methods may be employed in addition to, or in place of, other embodiments described herein for the short beacon. In these methods, an Extended Range Short Beacon (ERSB) may be used for pre/non-associated STAs for network access, or for associated STAs for broadcast of necessary information from AP, such as the TIM element. Depending on the usage requirements, or use cases, different short beacon types may be used for different purposes. As described herein, there may be different short beacon types defined to address these purposes. The procedure(s) for use of these short beacon types may be indicated by the primary, or legacy, beacon. For example a primary beacon frame may contain information on the transmission timing of the short beacon.

In a first method for this embodiment, a short beacon with low data rate transmission may have a MCS scheme with a low data rate, such as BPSK with ½ coding rate for example. Such an MCS scheme with a repetition 2 code would comply with IEEE 802.11ah networks for a 1 MHz bandwidth transmission mode.

A low data rate transmission scheme may be used for the ERSB to support an increased range. As a first example, repetition codes may be used, either in modulated symbol domain, or in coded bit domain, with or without interleaver between the repeated symbols/bits. In a second example for this method, the definition of very low rate codes, for example, rate 1/4 codes, may be used on any one or more channel coding schemes including, convolutional codes, Low Density Parity Check (LDPC) codes or other channel codes, depending on the standard requirements. In a third example of this method, use of space-time coding, such as STBC may be used to extend the range. Each of these method examples may require modifications to the PLCP header. Also the STF and LTF may need to be redesigned, or simply repeated.

In a second method for this embodiment, a short beacon with directional transmission may be used. A directional ERSB may be realized using either beamforming, or precoding. To enable either beamforming or precoding, a set of antenna weights may be predefined by the specification, preconfigured by the system, or set by an adaptive training procedure at the STA. According to the different ways for computing the weights, the resulting beacon may be a 'precoded beacon', 'sectorized beacon' or 'beamformed beacon'.

Due to the usage of the directional ERSB, different sets of weights may be selected for different users. For example, for non-associated STAs, the AP may utilize a set of predefined weights, which may sectorize the spatial domain physically with carefully designed antenna patterns. Or the AP may simply utilize a set of orthogonal weights and combination of the weights. For associated STAs with TIM expected to be received from the AP, or other multiple cast transmissions, the AP has the knowledge about the spatial signature of the STAs roughly. Thus, the AP may choose a group of users with similar spatial signature(s), then modulate the directional short beacon with that weight. The weight selection may be based on a predefined code book, or a general beamforming technique.

In order to reduce the impact of hidden notes problem in the directional beacon transmission, two protection schemes may be utilized. The primary beacon may broadcast the information when the next directional beacon will be transmitted. Moreover, an extra Omni PLCP header may be added before the directional short beacon PLCP Protocol Data Unit (PPDU) so that other STAs may hear the Omni part of the directional beacon, and set NAV accordingly.

Figure 15:
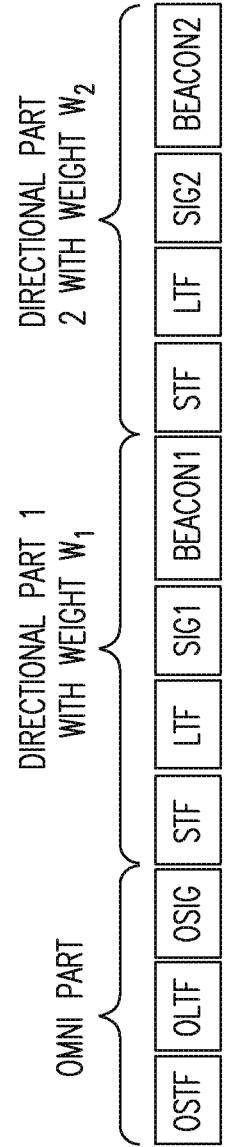
FIG. 15 shows an example of directional short beacon transmission with two directions/weights.

FIG. 15 shows an example of a directional ERSB transmitted with two directions/weights. In this directional short beacon, one or more directions/weights may be transmitted sequentially, shown as Directional Part 1 and Directional Part 2. As shown in FIG. 15, the Omni header part of the directional short beacon includes Omni STF (OSTF), Omni LTF (OLTF) and Omni SIG (OSIG) fields. In the Directional Parts 1 and 2, the signal fields SIG1 and SIG2 may contain the same or different information. Beacon fields Beacon1 and Beacon2 may contain the same or different information according to the purpose of the directional ERSB and related short beacon strategies.

In accordance with the above described methods related to short beacon coverage extension, a WLAN using short beacons may have increased range and coverage to support sub-1 GHz WiFi systems and Very High Spectrally Efficient (VHSE) WLAN system requirements.

A new field of channel access parameters may be included in the short beacon and/or regular beacon. For example, channel access parameters may include group ID(s) of STA group or groups that are allowed to access the upcoming beacon intervals and/or sub-intervals, (which may be contention-free or contention-based access).

A new field is included in the MLME-Scan.confirm primitive to report passive scan results obtained from short beacons as shown in Table 5.

TABLE 5

| Name | Type | Valid Range | Description |
|---|---|---|---|
| BSSDescriptionFromShortBeaconSet | Set of BSSDescriptionFromShortBeacon | N/A | The BSSDescriptionFromShortBeaconSet is returned to indicate the results of the scan request derived from short beacons. It is a set containing zero or more instances of a BSSDescriptionFromShortBeacon. |

Each BSSDescriptionFromShortBeacon consists of the elements shown in Table 6.

TABLE 6

| Name | Type | Valid Range | Description |
|---|---|---|---|
| Compressed SSID | Octet string | 0-4 octets | The hashed SSID of the found BSS |
| Short timestamp | Integer | N/A | The 4 byte LSBs of the Timestamp of the received frame (probe response/beacon) from the found BSS |

TABLE 6-continued

| Name | Type | Valid Range | Description |
|---|---|---|---|
| Time to the next full beacon | Integer | N/A | The time between the received short beacon frame to the next full beacon |
| MAC Address of the AP | MAC address | 6 bytes | MAC Address of the AP is obtained from the Source address (SA) in the received short beacon frame |
| Access network type (optional) | As defined in IEEE Std 802.11™-2012: Wireless LAN Medium Access Control (MAC) and Physical Layer (PHY) Specifications | 4 bits | The type of access network (such as public, private and etc.) |
| IP address availability or condensed IP address availability (optional) | As defined in IEEE Std 802.11u™-2011 | N/A | Availability of IP address of various types of the found BSS |
| Channel Access Parameters | As defined herein | N/A | Parameters that indicate which STA(s) may conduct channel access in the upcoming beacon intervals and/or sub-intervals. |

A new sub-field to the BSSDescription field to report channel access parameters obtained from the regular beacon may be added, as shown in Table 7.

TABLE 7

| Name | Type | Valid Range | Description |
|---|---|---|---|
| Channel Access Parameters | As defined herein | N/A | Parameters that indicate which STA(s) may conduct channel access in the upcoming beacon intervals and/or sub-intervals. |

For the MLME-Scan.request, two new parameters called the MaxChannelTimeforShortBeacon and the MinChannelTimeforShortBeacon may be added in MLME-Scan.request primitive to allow more efficient scanning, as shown in Table 8.

TABLE 8

| Name | Type | Valid Range | Description |
|---|---|---|---|
| MaxChannelTimeforShortBeacon | Integer | ≤MaxChannelTime | The maximum time (in TU) to spend on each channel when scanning for short beacon, and is optionally present if the dot11ah is true. |
| MinChannelTimeforShortBeacon | Integer | ≤MinChannelTime | The minimum time (in TU) to spend on each channel when scanning for short beacon, and is optionally present if the dot11ah is true. |

To become a member of a particular ESS using passive scanning, a STA may scan for beacon frames containing that ESS's SSID, and return all beacon frames matching the desired SSID in the BSSDescriptionSet parameter of the corresponding MLME-SCAN.confirm primitive with the appropriate bits in the Capabilities Information field indicating whether the beacon frame came from an infrastructure BSS or IBSS.

A STA (e.g., an IEEE 802.11ah compliant STA) may additionally scan for short beacon frames, returning all short beacon frames matching the desired parameters, (such as SSID and etc.), in the corresponding MLME-SCAN.request primitive using BSSDescriptionFrom-ShortBeaconSet in the MLME-SCAN.confirm primitive. For example, a Short Beacon frame can be considered to be matched with the desired parameters in the corresponding MLME-SCAN.request primitive when the compressed SSID of received Short Beacon frames matches the hashed SSID or SSIDList parameter, (if they are specified in the corresponding MLME-SCAN.request primitive).

The STA may listen to each channel scanned for no longer than a maximum duration defined by the MaxChannelTime parameter. Alternatively, when scanning for short beacons, a STA may listen to each channel scanned for no longer than a maximum duration defined by the MaxChannelTimeforShortBeacon, (as defined herein). In addition, when scanning for short beacons, a STA may listen to each channel scanned for no less than a minimum duration defined by the MinChannelTimeforShortBeacon (as defined herein).

According to this embodiment, one MLME-Scan.request primitive of passive scan type may trigger two different scans: one for short beacon and the other for full beacon. The STA (e.g., a IEEE 802.11ah enabled STA), may then perform passive scanning based on the following example procedure.

Figure 16:
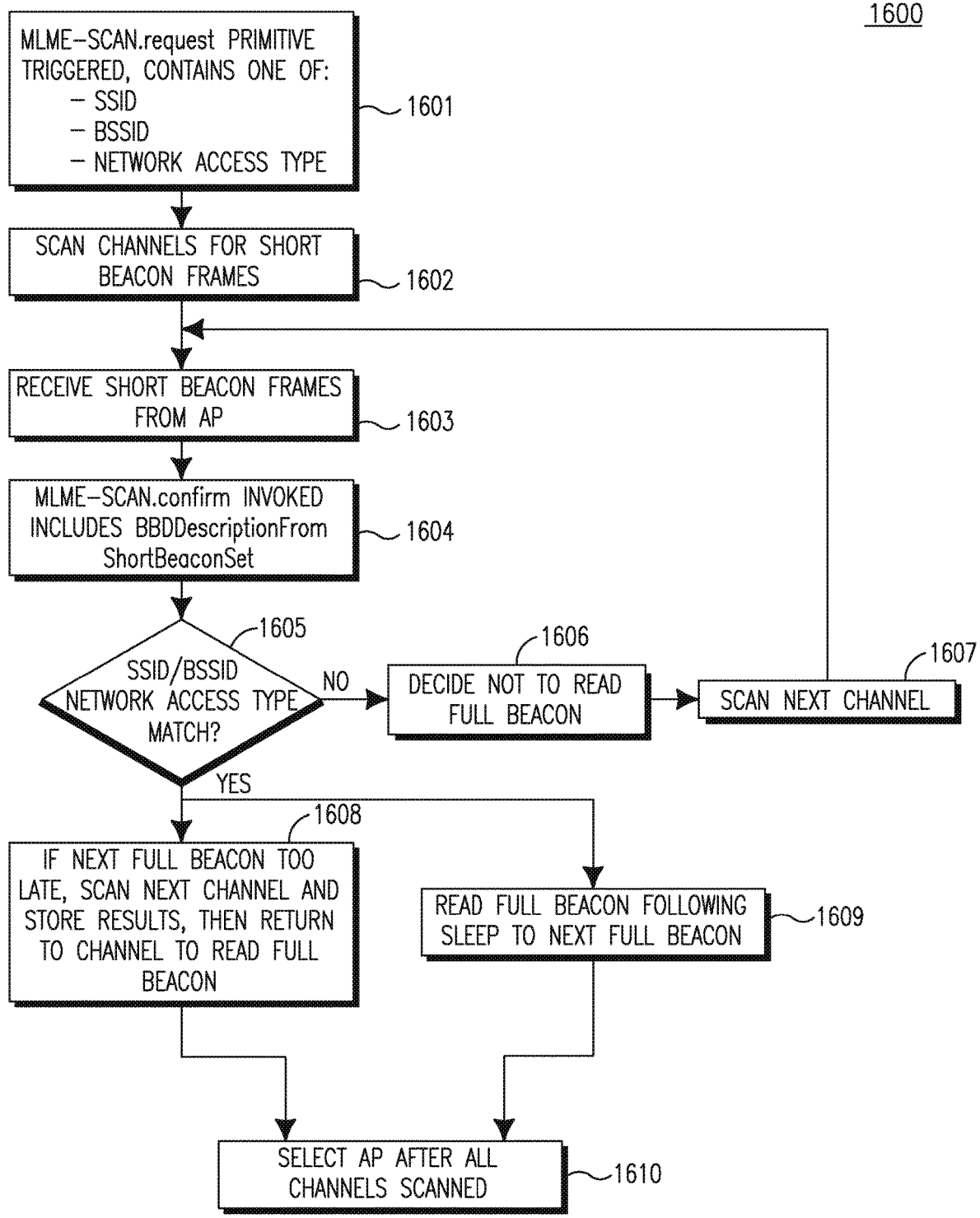
FIG. 16 shows an example method flowchart of AP and STA behaviour for a passive scanning method.

FIG. 16 shows a method flowchart for STA behavior of passive scanning using short beacon in accordance with this embodiment. Upon receipt of the MLME-SCAN.request primitive with ScanType indicating passive scan, a STA may perform passive scanning on each channel included in the ChannelList parameter in the MLME-SCAN.request primitive.

The STA may scan the channel for short beacons first for the duration of MaxChannelTimeforShortBeacon. Then, the STA may generate a MLME-SCAN.confirm primitive that contains the field of BSSDescriptionFromShortBeaconSet to indicate the results obtained from all the received short beacons.

The STA (via the SME within the STA) may evaluate the basic information in the MLME-SCAN.confirm, (e.g., BSS-DescriptionFromShortBeaconSet), or the received short beacon to decide whether at least one found BSS is usable or worthy to read the corresponding full beacon. The decision can be made based on one or any combination of several of the following example criteria.

If the MLME-SCAN.request primitive specifies a SSID or a SSID List, then the STA may compute the hash of the SSID or SSIDs in the SSID list and compare with the received compressed SSID. If not matched for any found BSS, the STA may decide not to read the corresponding full beacon.

If the MLME-SCAN.request primitive specifies a BSSID, then the STA may compare the requested BSSID with the SA field of the received short beacon. If not matched for any found BSS, the STA may decide not to read the corresponding full beacon.

If the MLME-SCAN.request primitive specifies a particular access network type, then the STA may compare the access network type in the MLME-SCAN.request primitive with the network access type field in the received short beacon frame. If not matched for any found BSS, the STA may decide not to read the corresponding full beacon.

If the IP address type that the STA supports is not available at any found BSS, (for example, IPv4 address not available and the STA is an IPV4 only STA), the STA may decide not to read the corresponding full beacon.

If the STA decides to read the corresponding full beacon, the STA selects one of the following methods. As a first method, the STA may go to doze/sleep mode and wakes up n time units (TUs) before the time indicated by the field "Time to the next full beacon" to receive the full beacon, where the value of n is a design parameter and may be specified in the standards.

As a second method, the STA may take different actions depending on the wait time for the next full beacon. If time to the next full beacon minus n TUs is not greater than the MaxChannelTimeforShortBeacon, then the STA goes to doze/sleep mode and wakes up n TUs before the time indicated by the field "Time to the next full beacon" to receive the full beacon). If time to the next full beacon minus n TUs is larger than the MaxChannelTimefor-ShortBeacon, then the STA may scan for short beacons on the next channel(s) in the ChannelList, and tune back to the current channel at least n TUs before the time indicated by the field "Time to the next full beacon" to receive the corresponding full Beacon. The scan results of the next channel(s) may be stored for the purpose of a potential scan of full beacons on those channels later on. In this way, total passive scanning time is reduced without more power consumption.

If the STA decides not to read the corresponding full beacon, then the STA may scan the next channel according to the ChannelList parameter in the MLME-SCAN.request primitive.

After scanning all the channels, the STA, (or the SME within the STA), may choose the AP(s) to associate to based on the information in received MLME-SCAN.confirm primitives.

The STA may receive some full beacons within the duration of MaxChannelTimeforShortBeacon. In this case, the STA may proceed according to at least one of the following reporting options.

In a first option, the partial scan results of full beacons may be reported using the BSSDescriptionSet with a newly-defined ResultCode of "Incomplete" within the same MLME-SCAN.confirm that reports the scan results of short beacons. For each AP/BSS whose full beacon information is reported in the MLME-SCAN.confirm, the STA may choose not to report its short beacon information. For each AP/BSS whose full beacon information is already reported in the MLME-SCAN.confirm, the STA may not read the corresponding full beacon again in as in steps 1609, 1610.

In second option, the partial scan results of full beacons are not reported in the MLME-SCAN.confirm.

In order to support the stopping of processing a packet that is currently being received, a Physical Layer Convergence Procedure (PLCP) receive procedure is modified and new primitives may be defined. FIG. 17 shows an example of a modified PLCP receive procedure with newly defined primitives to support the stopping of processing of packets. The PLCP receive procedure is generically described and may be applied to any WiFi and wireless standards. The SIG field and the training fields depicted in FIG. 17 may have multiple parts and may be located in any order in any part of the frame. The newly defined primitives shown in FIG. 17 are PHY-RXSTOP.request 1701, PHY-RXSTOP.confirm 1702, PMD_RXSTOP.request 1703, PMD_RXSTOP.confirm 1704.

The PHY-RXSTOP.request 1701 primitive is a request by the MAC sublayer to the local PHY entity to stop processing a PPDU that the PHY entity is currently receiving. This primitive has no parameters and may be issued by the MAC sublayer to the PHY entity when the MAC sublayer detects that the packet that is currently being received is not needed by the MAC sublayer. This primitive may be issued at any time between the time when the local PHY layer issued a PHY-RXSTART.indication primitive to the MAC sublayer and the time when the local PHY layer issued a PHY-RXEND.indication primitive to the MAC sublayer for the same PPDU. The effect of receipt of this primitive by the PHY entity may be to stop the local receive state machine, including issuing a PMD_RXSTOP.request 1703 to the PMD sublayer.

The PHY-RXSTOP.confirm 1702 primitive may be issued by the PHY to the local MAC entity to confirm the stop of processing of a PPDU that was previously being processed. The PHY issues this primitive in response to every PHY-RXSTOP.request 1701 primitive issued by the MAC sublayer. The PHY-RXSTOP.request(PacketEndTime) primitive may contain no parameters. Alternatively, it may have a parameter PacketEndTime. PacketEndTime may indicate the end of the PPDU that was previously being received but whose processing was stopped by the PHY-RXSTOP.request 1701 primitive by the local MAC sublayer. In another example, PacketEndTime may indicate the end of the TXOP indicated by for example, length field or the ACK fields, in the PLCP header. This primitive may be issued by the PHY to the MAC entity in response to at least one of the following conditions: 1) the PHY has received a PHY-RXSTOP.request 1701 primitive from the MAC entity; 2) the PLCP has issued PMD_RXSTOP.request 1703 primitive; or 3) the PMD has issued PMD-RXSTOP.confirm 1704 primitive to the PLCP. The effect of receipt of this primitive by the MAC sublayer may be to enter Doze State for a period. Such a period may last until the end of the current PPDU, until the end of the current TXOP, until the PHY entity issues to the MAC sublayer PHY-CCA.indication (IDLE) or of any other length. The MAC sublayer may enter CS/CCA state after such a period.

The PMD_RXSTOP.request 1703 primitive, generated by the PHY PLCP sublayer, may initiate PPDU transmission by the Physical Medium Dependent (PMD) layer. This primitive may have no parameters and may be generated by the PLCP sublayer to terminate the PMD layer reception of the PPDU. The PHY-RXSTOP.request 1701 primitive may be provided to the PLCP sublayer prior to issuing the PMD_RXSTOP.request 1703 command. The primitive PMD_RXSTOP.request 1703 terminates the reception of a PPDU by the PMD sublayer.

The PMD_RXSTOP.confirm 1704 primitive, generated by the PMD entity, may indicate the end of PPDU reception by the PMD layer. This primitive may have no parameters and may be generated by the PMD entity when the PMD entity has received a PMD_RXSTOP.request 1703 from the PHY PLCP sublayer and the PMD entity has stopped the reception of the PPDU that it was previously receiving. The PLCP sublayer may determine that the reception of the PPDU is stopped at the PMD sublayer. The PLCP sublayer may issue a PHY-RXSTOP.confirm 1702 to the MAC sublayer to confirm the stop of the reception of the PPDU.

The existing primitive PHY-RXEND.indication may be modified by adding a value to its parameter RXERROR. A value of "RXSTOPPED" may be added as a valid value for RXERROR indicating that the reception of a PPDU has been stopped by explicit commands.

As shown in FIG. 17, any time between the time when a PLCP sublayer issues a PHY-RXSTART.indication primitive to the MAC sublayer and the time when the PLCP sublayer issues a PHY-RXEND.indication primitive to the MAC sublayer, the MAC sublayer may determine that a packet that is currently being received is not needed. For example, this may happen when the MAC sublayer discovers that a beacon frame is being received and it does not need any IEs or it has received all the IEs that it needs. This may potentially occur after having verified the integrity of the received MPDU using mid-CRC or other methods. In another example, the MAC sublayer has decoded the MAC header and discovered that the MPDU is not meant for itself. This may potentially occur after having verified the integrity of the received MPDU using a specially designed FCS for the MAC header or other methods.

The MAC sublayer may issue a PHY-RXSTOP.request 1701 primitive to the local PHY entity to request that the local PHY entity should stop processing the PPDU that is currently being received.

The PHY PLCP sublayer may then stop decoding and descrambling the coded PSDU, and issue a PMD_RXSTOP.request 1703 primitive to the PMD sublayer.

The PMD sublayer may then stop receiving the PPDU and issue a PMD_RXSTOP.confirm 1704 to confirm that the PMD sublayer has stopped processing the PPDU.

The PHY PLCP sublayer may then issue a PHY-RXSTOP.confirm 1702 to the MAC sublayer to confirm that the PHY entity has stopped processing the PPDU. The MAC sublayer may then enter the Doze state for a period. This period may last until the end of the current PPDU, the end of the current TXOP, until the PHY entity issues to the MAC sublayer PHY-CCA.indication(IDLE) or of any other length. The MAC sublayer may enter Carrier Sense/Clear Channel Assessment (CS/CCA) state after such a period. The MAC sublayer may also issue a primitive to wake up the local PHY entity after such a period.

The local PHY entity may issue a PHY-RXEND.indication at the scheduled end of the PPDU whose processing has been stopped or at the end of the TXOP to provide timing to the MAC sublayer. The PHY-RXEND.indication may have the parameter of RXERROR set to a new value "RXSTOPPED".

The local PHY entity may start to monitor the wireless medium at the scheduled end of the PPDU whose processing has been stopped or at the end of the TXOP and issue a PHY-CCA.indication (IDLE) to the MAC sublayer.

In another example, the local PHY entity may detect from the PLCP headers that a PPDU that is currently being received is not needed, by for example, examining the partial association identifier (AID) field, or any existing or new fields such as a Direction Indication field, length field, and the like. The PHY entity may also stop processing of the PPDU using the procedure described herein without receiving commands from the MAC sublayer.

Any time between the time when the PMD sublayer issues a PMD_data.indication(first) primitive to the PLCP sublayer and the time when the PMD sublayer issues the last PMD_data.indication primitive to the PLCP sublayer, the PLCP sublayer may determine that a packet that is currently being received is not needed. For example, when the Partial AID or Group ID does not match those of the current STA. In another example, the PLCP sublayer detects that the Direction Indication Bit indicates that the packet is sent to the AP while the current STA is a non-AP STA.

The PHY PLCP sublayer may then stop decoding and descrambling the coded PSDU, and issues a PMD_RXSTOP.request 1703 primitive to the PMD sublayer. The PMD sublayer may then stop receiving the PPDU and issues a PMD_RXSTOP.confirm 1704 message to confirm that the PMD sublayer has stopped processing the PPDU.

The PHY entity may issue a PHY-RXEND.indication at the scheduled end of the PPDU whose processing has been stopped or at the end of the TXOP or any other time to provide timing to the MAC sublayer. The PHY-RXEND.indication may have the parameter of RXERROR set to a new value "RXSTOPPED".

The local PHY entity may start to monitor the wireless medium at the scheduled end of the PPDU whose processing has been stopped or at the end of the TXOP or any other time and issue a PHY-CCA.indication(IDLE) to the MAC sublayer.

In accordance with the above methods relating to stopping packet processing, a STA that is interested in no IEs or just a few IEs is enabled to stop processing of a long beacon. The STA may desire to stop processing a packet after recognizing certain aspects of the packets that are currently being received that do not fit its needs. For example, this may be the case when a STA recognizes from the preamble that it cannot be possibly be the destination of the packet that is being received.

Although the solutions described herein consider IEEE 802.11 specific protocols, it is understood that the solutions described herein are not restricted to this scenario and are applicable to other wireless systems as well.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented in a station (STA), the method comprising:
   receiving a fast initial link setup (FILS) discovery frame including a compressed short service set identifier (SSID);
   comparing a short SSID parameter in a MAC sublayer management entity (MLME) MLME-scan.request primitive and the compressed SSID; and
   reporting a MLME-SCAN.confirm primitive responsive to the comparing of the short SSID and the compressed SSID based on the MLME-scan.request primitive including a report option set to immediate.

2. The method of claim 1, wherein the FILS discovery frame comprises a version number information.

3. The method of claim 1, wherein the FILS discovery frame comprises at least one of a Common Advertisement Group (CAG) number or an AP Configuration Sequence Number (AP-CSN).

4. The method of claim 1, the FILS discovery frame comprises a traffic information map (TIM).

5. The method of claim 1, wherein the FILS discovery frame includes an access network type.

6. The method of claim 5, the method further comprising comparing the access network type received in the FILS discovery frame with a wildcard access network type to confirm a match.

7. A station (STA) comprising:
   a processor; and
   a memory including processor-executable instructions that, when executed by the processor, cause the processor to:
     identify a short service set identifier (SSID) parameter in a MAC sublayer management entity (MLME) MLME-scan.request primitive
     receive a fast initial link setup (FILS) discovery frame including a field for a compressed SSID;
     compare the short SSID parameter and the compressed SSID; and
     report a MLME-SCAN.confirm primitive responsive to the comparing of the short SSID and the compressed SSID, if the MLME-scan.request primitive includes a report option set to immediate.

8. The STA of claim 7, wherein the FILS discovery frame comprises a version number information.

9. The STA of claim 7, wherein the FILS discovery frame comprises at least one of a Common Advertisement Group (CAG) number or an AP Configuration Sequence Number (AP-CSN).

10. The STA of claim 7, wherein the FILS discovery frame comprises a traffic information map (TIM).

11. The STA of claim 7, wherein the FILS discovery frame includes an access network type.

12. The STA of claim 11, wherein the processor compares the access network type received in the FILS discovery frame with a wildcard access network type to confirm a match.

* * * * *